Figure 1:
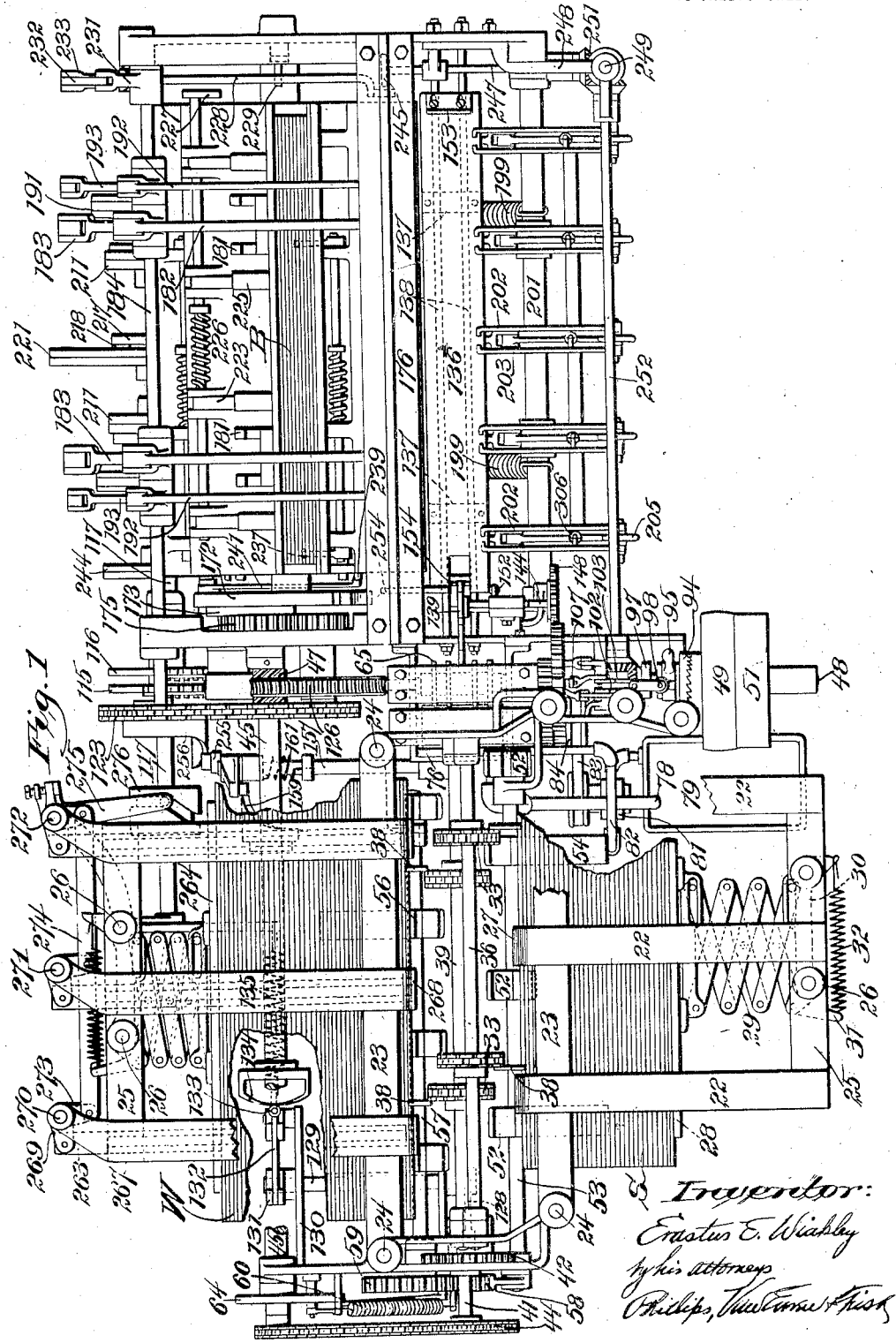

E. E. WINKLEY.
PASTING AND ASSEMBLING MACHINE.
APPLICATION FILED AUG. 5, 1916.

1,356,845. Patented Oct. 26, 1920.
15 SHEETS—SHEET 1.

E. E. WINKLEY.
PASTING AND ASSEMBLING MACHINE.
APPLICATION FILED AUG. 5, 1916.

1,356,845.

Patented Oct. 26, 1920.
15 SHEETS—SHEET 4.

Inventor:
Erastus E. Winkley
by his attorneys
Phillips, Van Everen & Fish

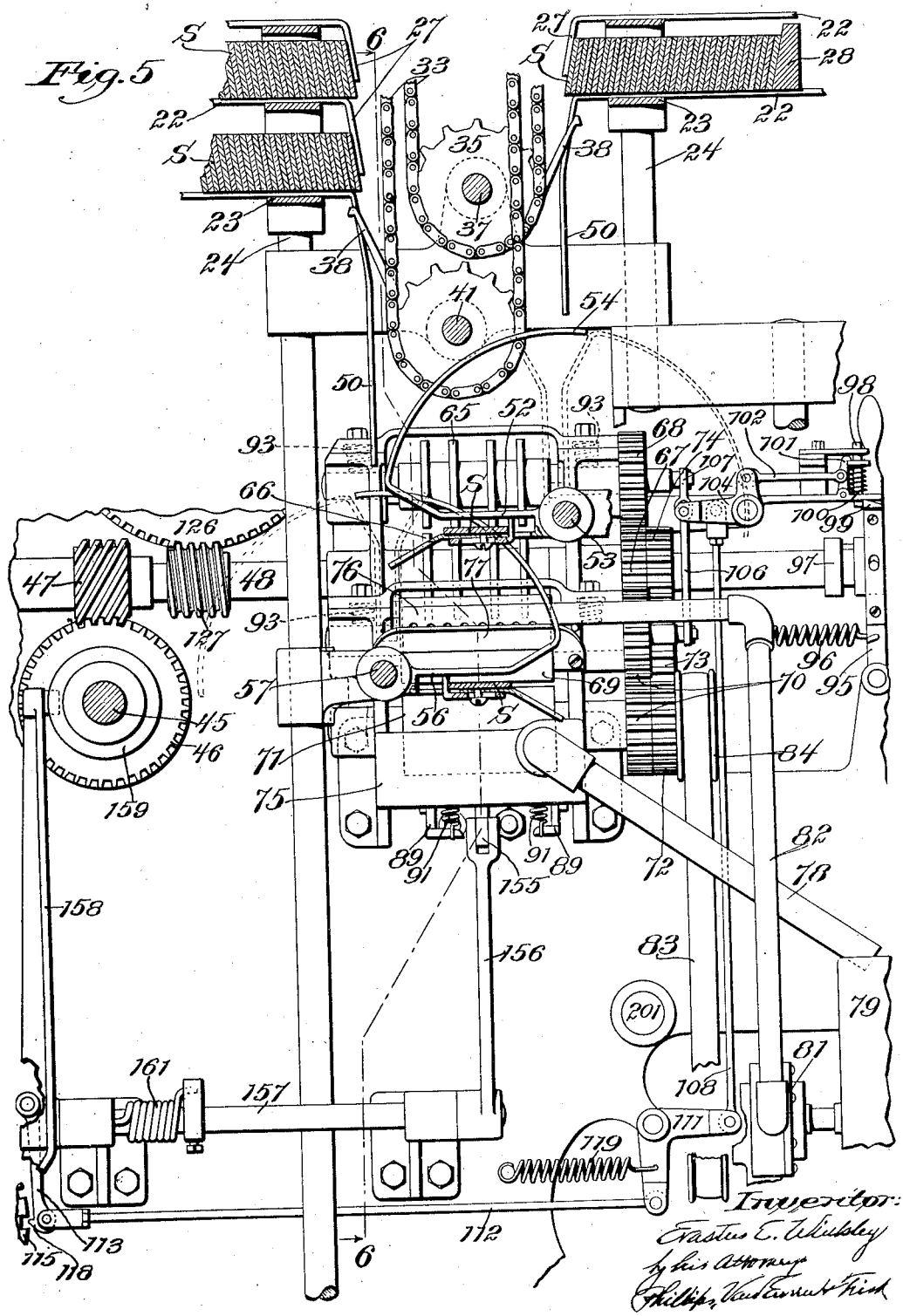

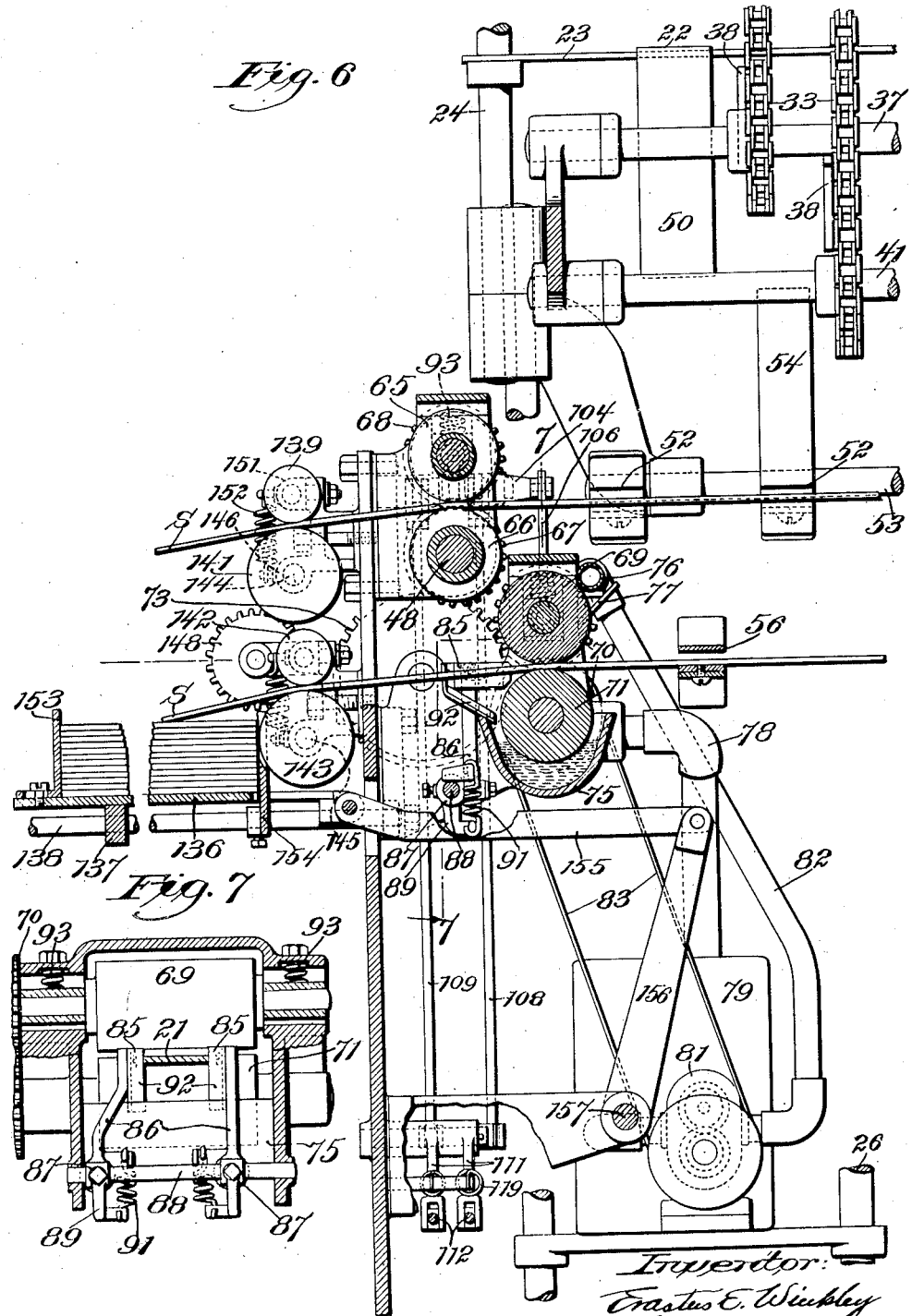

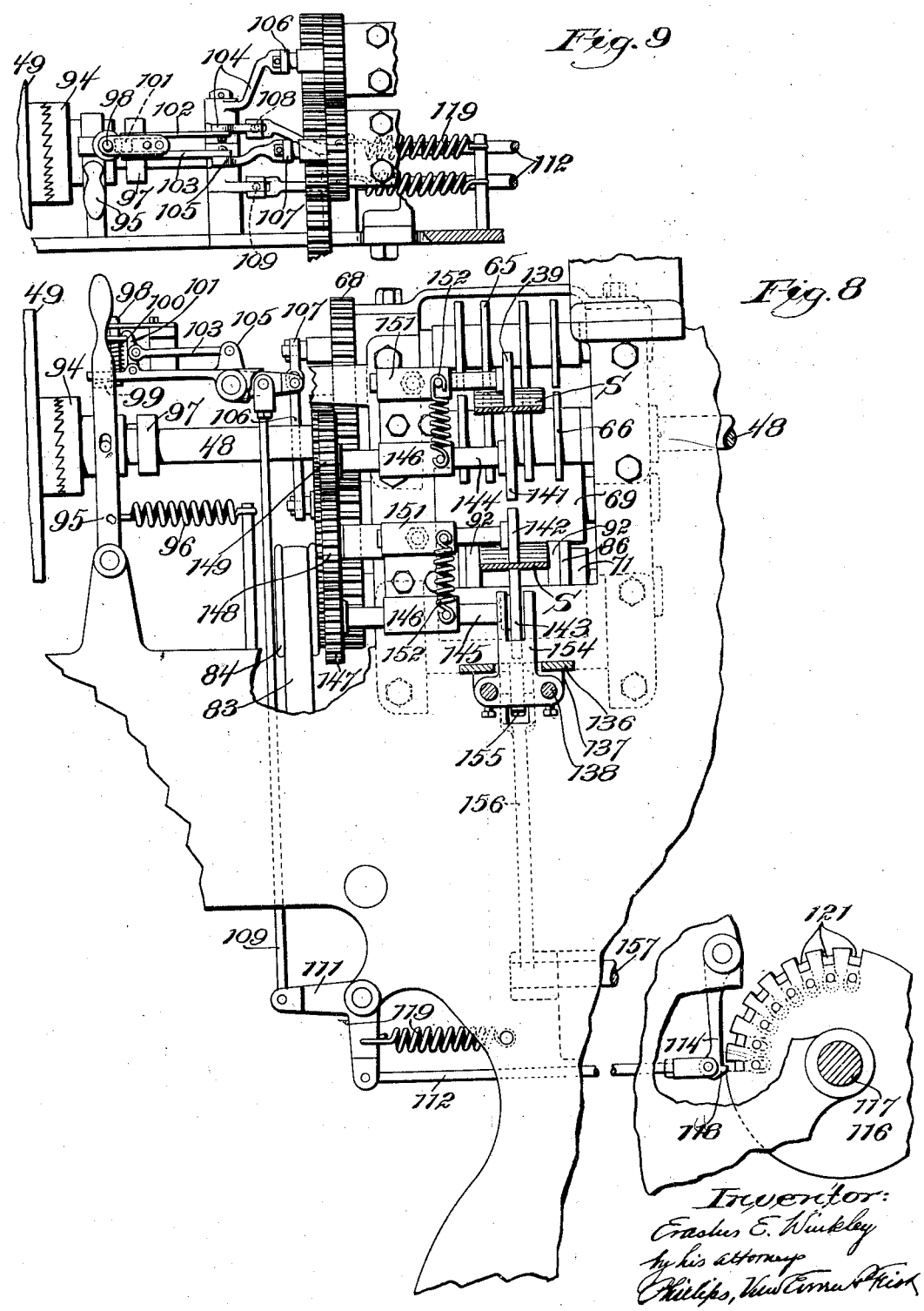

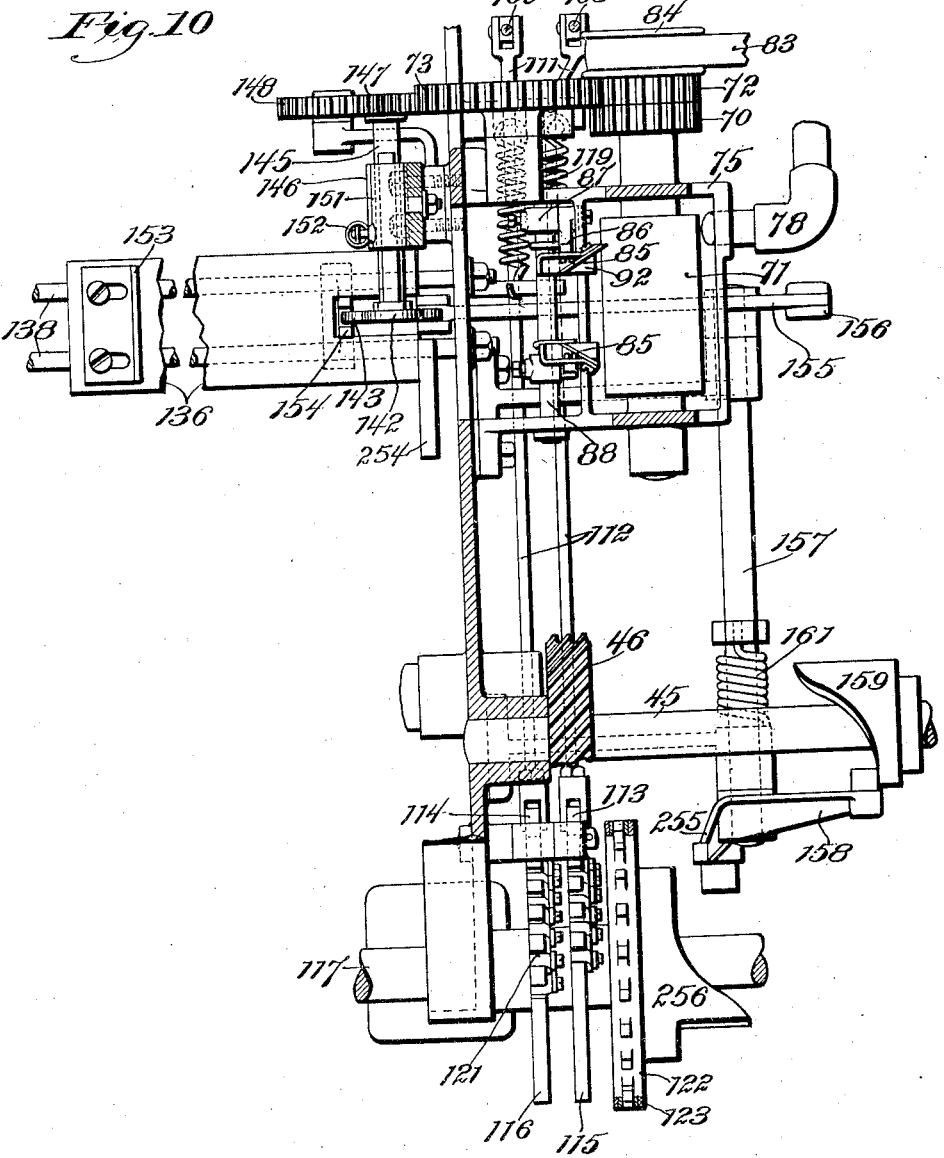

E. E. WINKLEY.
PASTING AND ASSEMBLING MACHINE.
APPLICATION FILED AUG. 5, 1916.
1,356,845.
Patented Oct. 26, 1920.
15 SHEETS—SHEET 9.
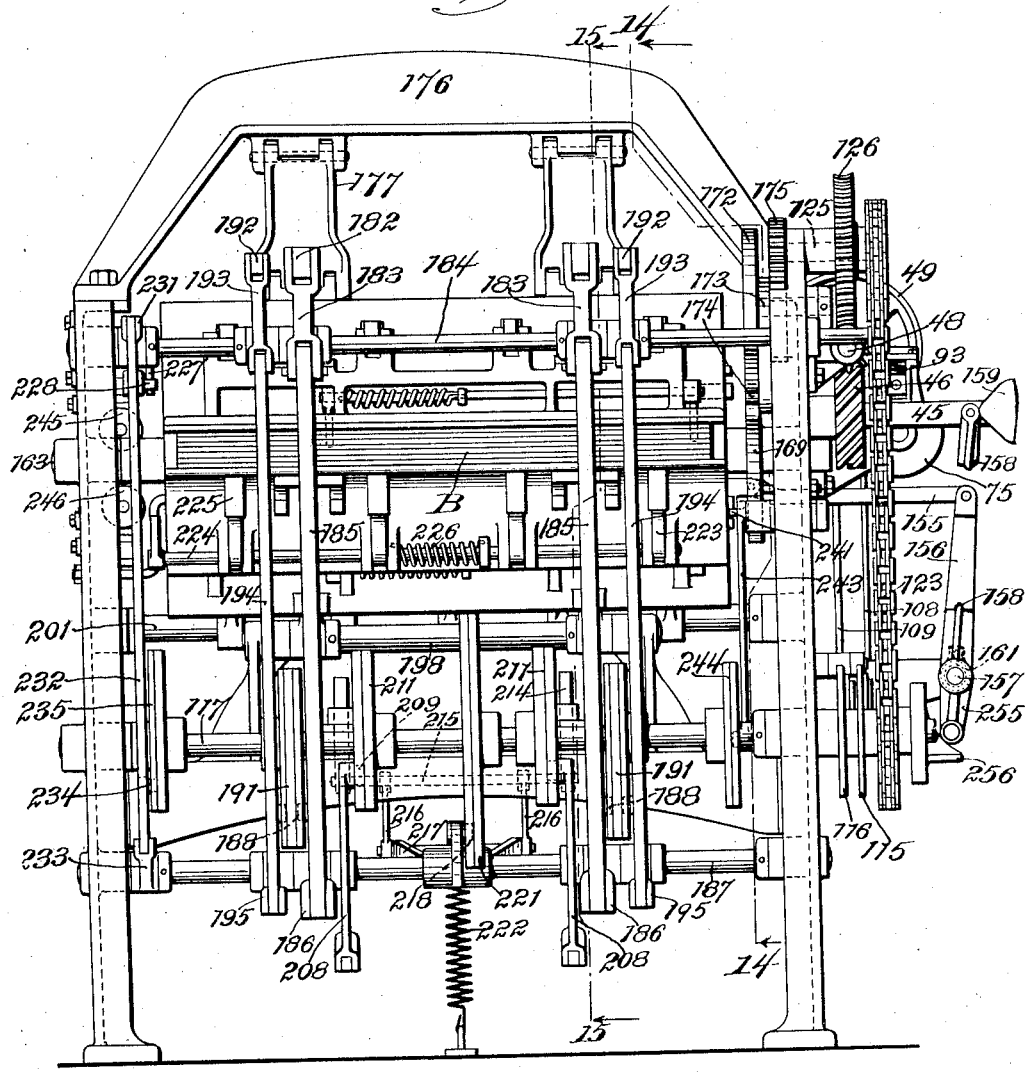

E. E. WINKLEY.
PASTING AND ASSEMBLING MACHINE.
APPLICATION FILED AUG. 5, 1916.

1,356,845.

Patented Oct. 26, 1920.
15 SHEETS—SHEET 10.

E. E. WINKLEY.
PASTING AND ASSEMBLING MACHINE.
APPLICATION FILED AUG. 5, 1916.
1,356,845.
Patented Oct. 26, 1920.
15 SHEETS—SHEET 15.
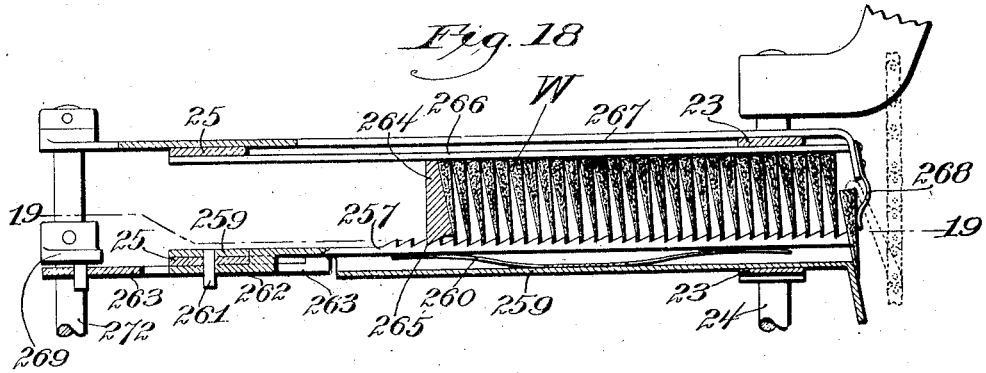
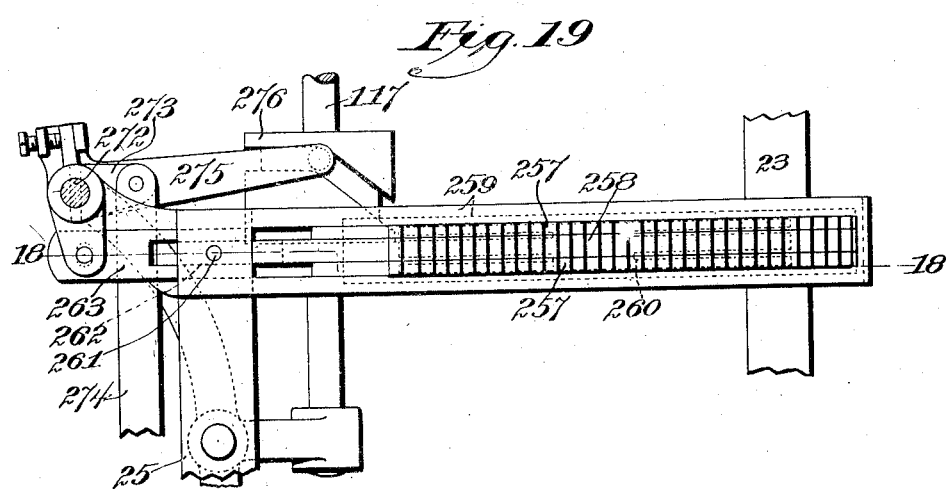
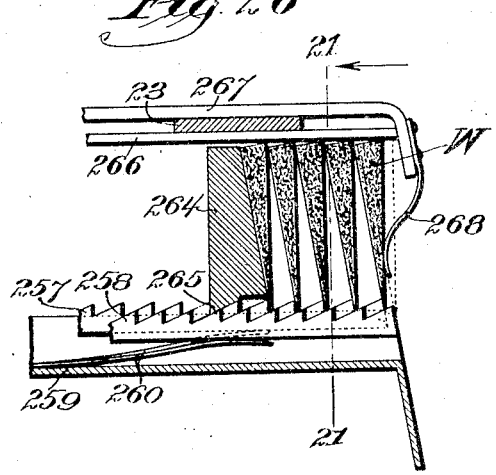
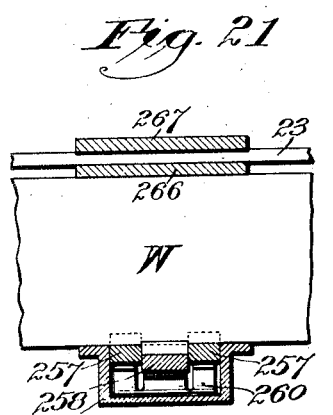
Inventor:
Erastus E. Winkley
by his attorney
Phillips, Van Everen & Fish

UNITED STATES PATENT OFFICE.

ERASTUS E. WINKLEY, OF LYNN, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

PASTING AND ASSEMBLING MACHINE.

1,356,845.  Specification of Letters Patent.  Patented Oct. 26, 1920.

Application filed August 5, 1916. Serial No. 113,332.

*To all whom it may concern:*

Be it known that I, ERASTUS E. WINKLEY, a citizen of the United States, residing at Lynn, in the county of Essex and State of Massachusetts, have invented certain new and useful Improvements in Pasting and Assembling Machines; and I do hereby declare the following to be a full, clear, and exact description of the invention, such as will enable others skilled in the art to which it appertains to make and use the same.

This invention relates to machines by which pieces of sheet-material are assembled in piles, with paste or adhesive applied to the adjacent surfaces of the pieces, so as to cement them together and form solid blocks.

One object of the invention is to produce a machine, of the type above referred to, which shall perform automatically some, and preferably all, of the sequence of operations comprising feeding the pieces of material in the proper number and in suitably graded sizes, applying paste to certain of the pieces, superposing the pieces on each other in the proper alinement or relation, pressing the pieces together, holding them in compressed relation until the paste has set and caused the firm adhesion of the pieces, and finally discharging the block, so formed, from the machine.

A more specific object of the invention is to produce a machine for producing elongated blocks, of material such as leatherboard, these blocks being formed of strips of graded widths, so as to produce a cross-section approximating the longitudinal section of a shoe-heel, and the blocks so produced being adapted to be cut into short pieces from which heels may be formed by trimming or rounding them in any convenient manner.

To the foregoing ends the invention resides in the combinations and sub-combinations of parts of the machine illustrated in the accompanying drawings and hereinafter described, as it is defined in the appended claims.

Figure 2:
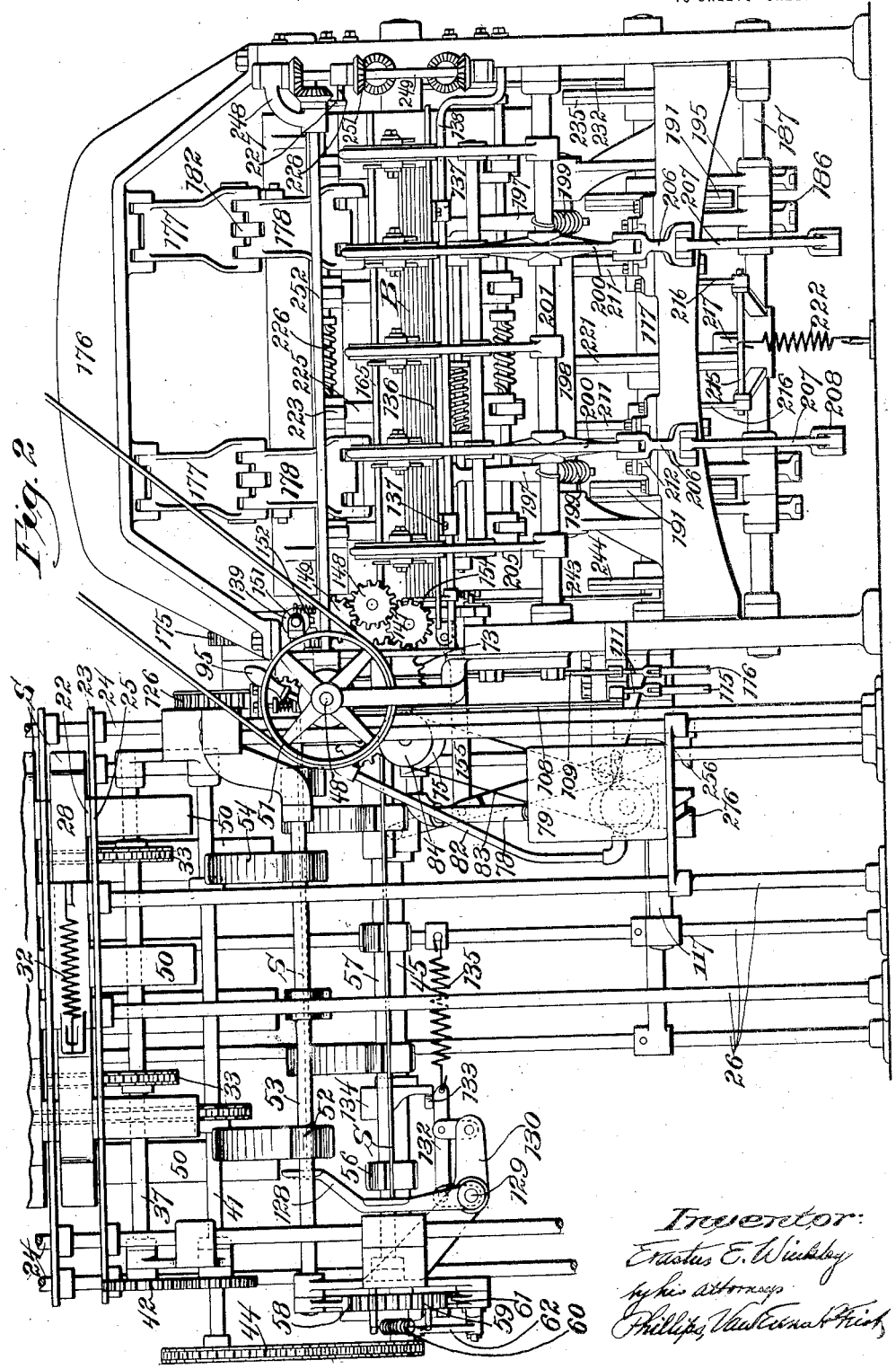
Figure 3:
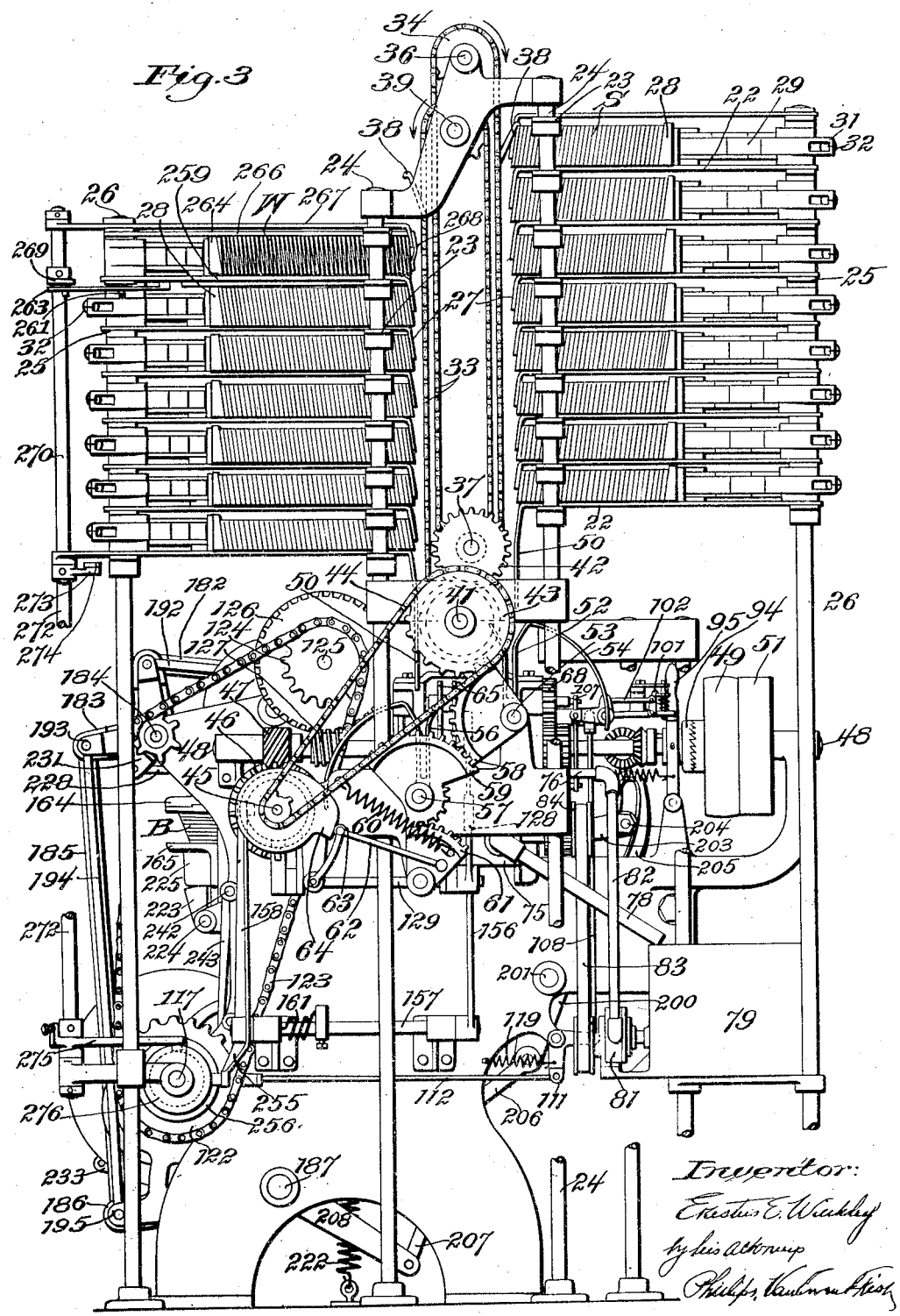
Figure 4:
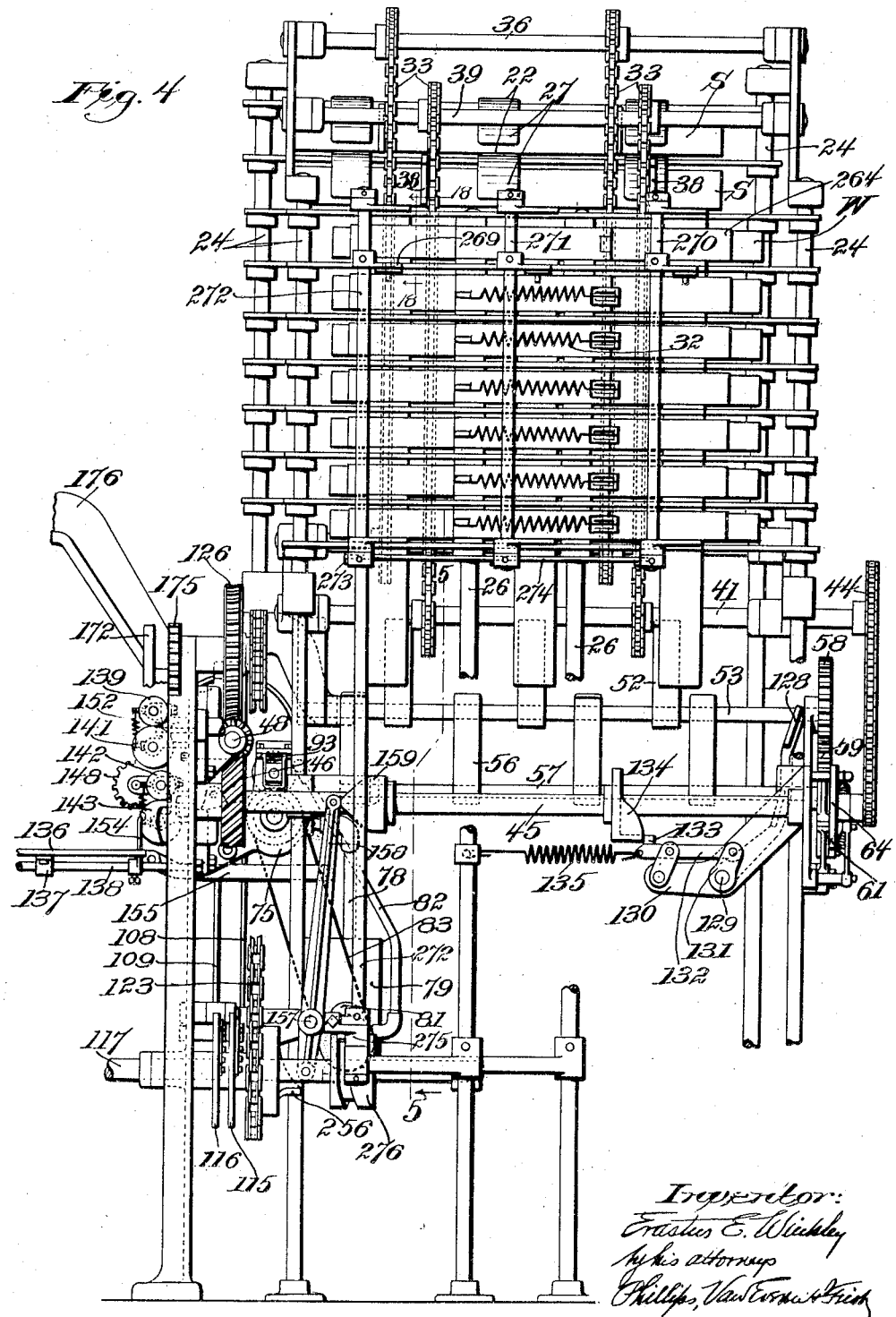
Figure 12:
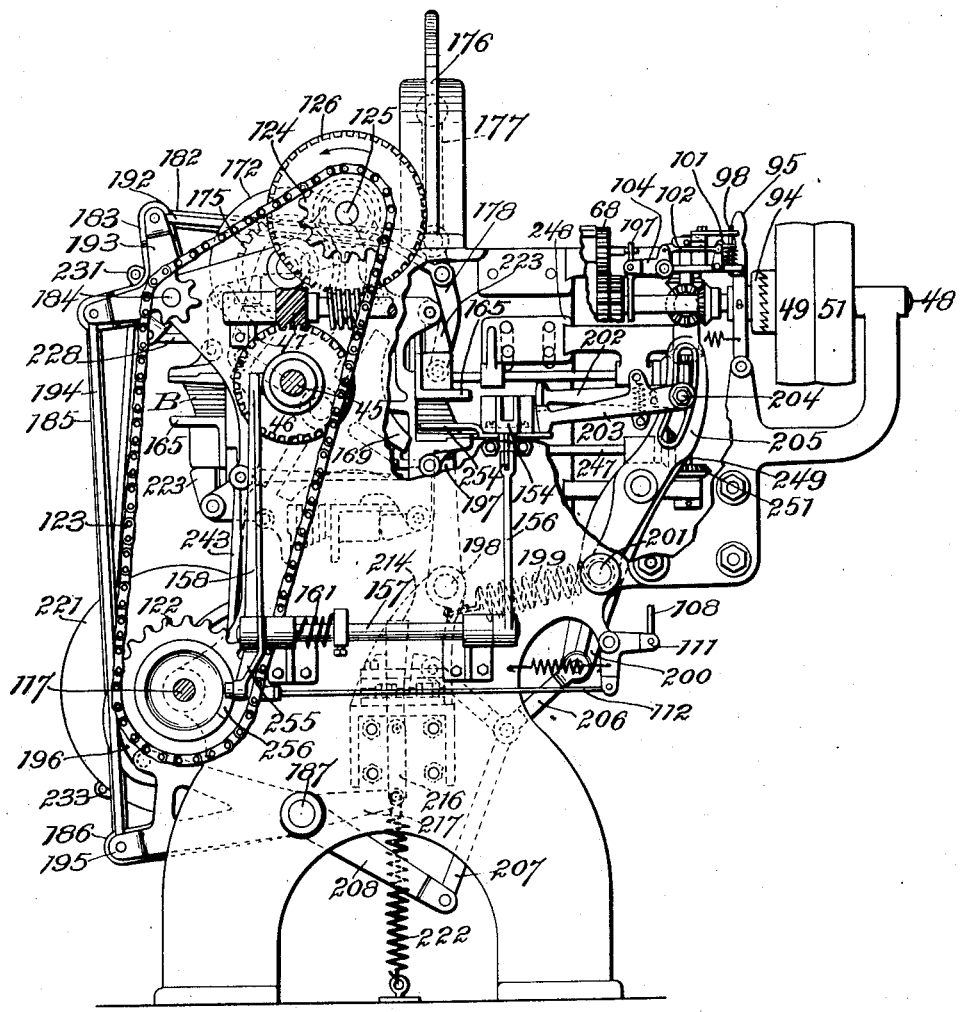
Figure 13:
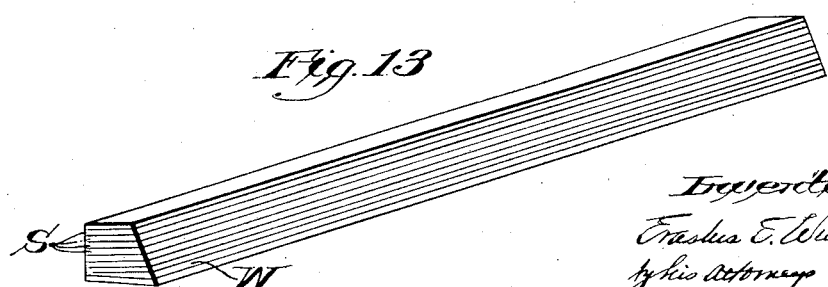
Figure 14:
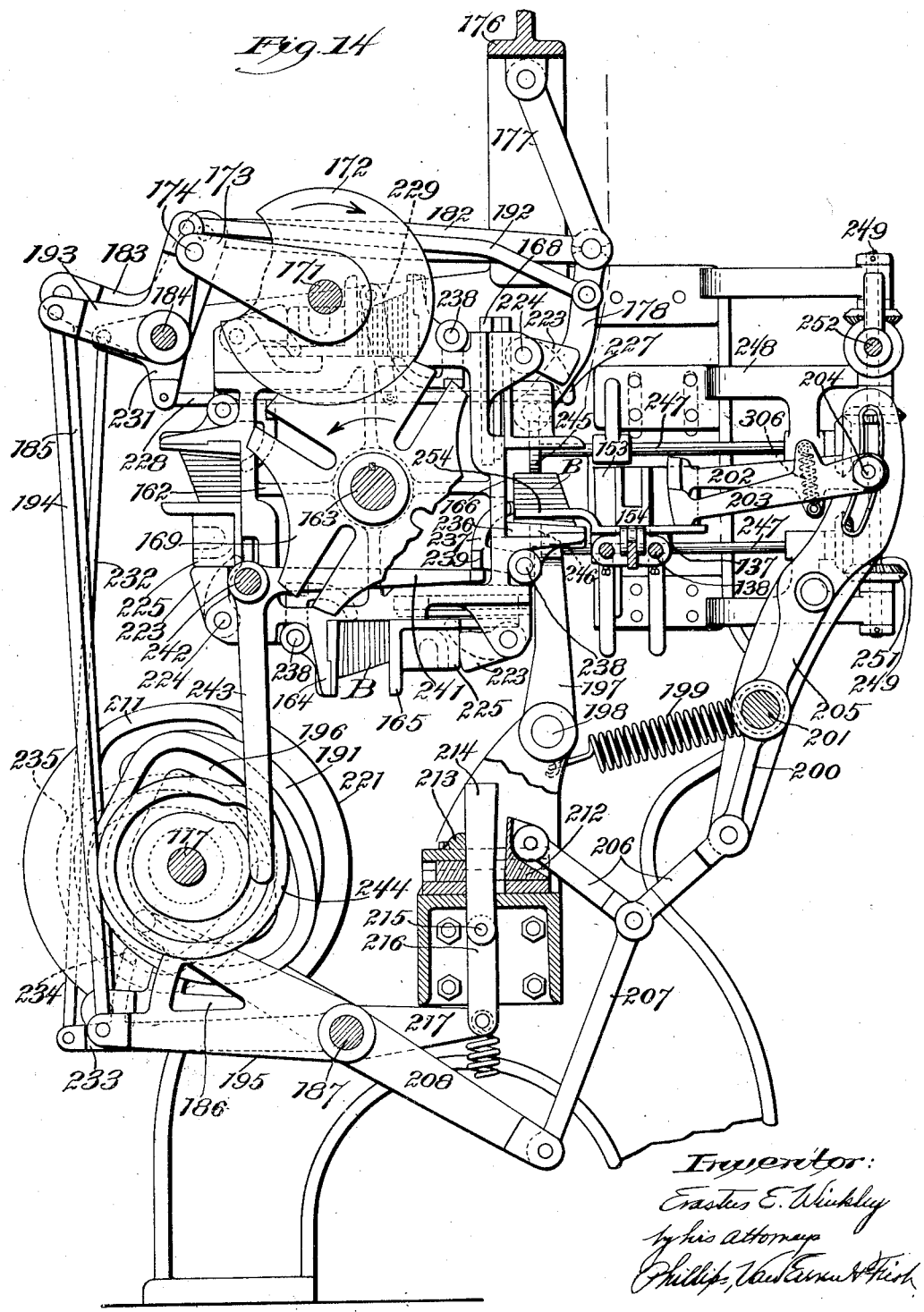
Figure 15:
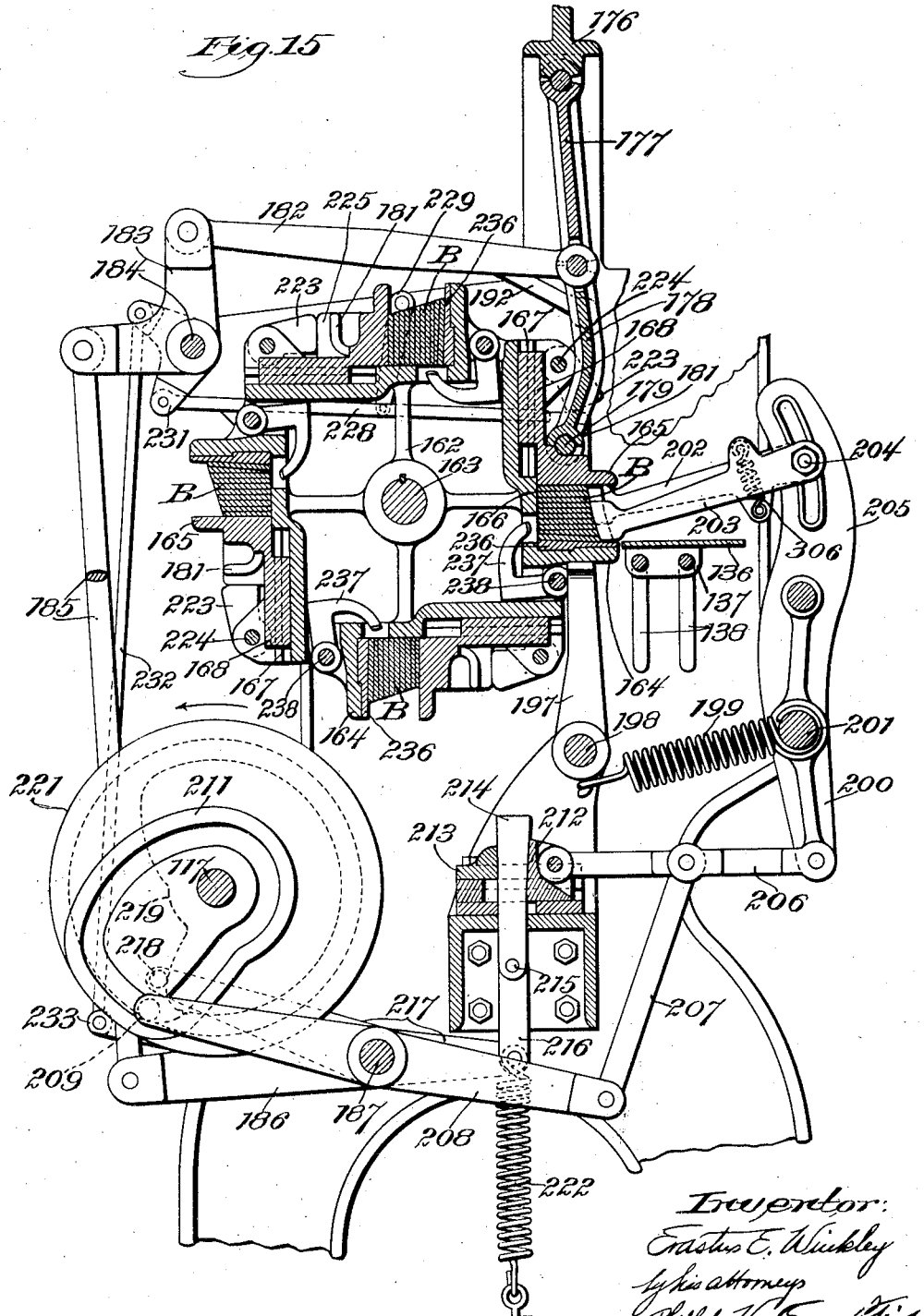
Figure 16:
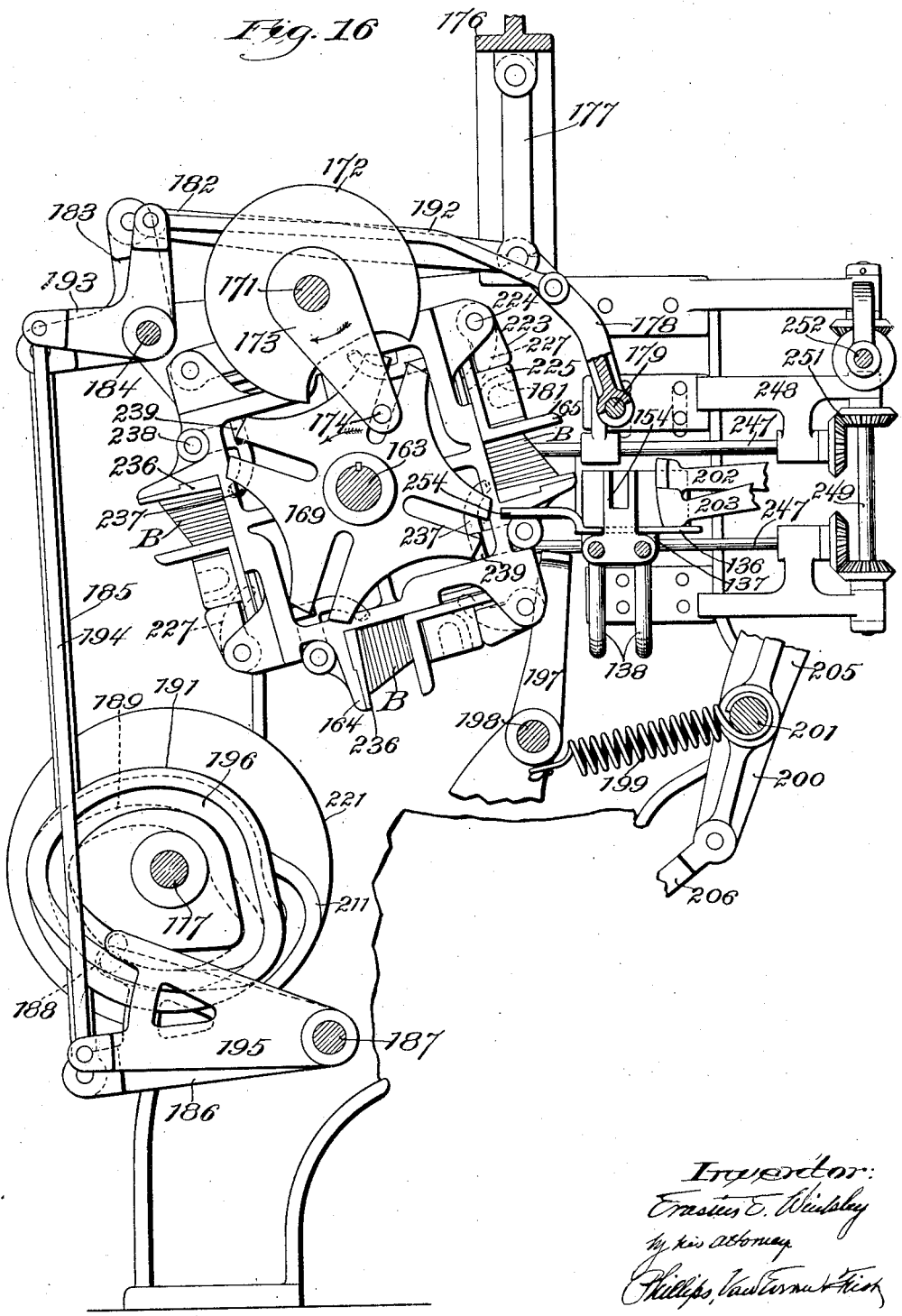
Figure 17:
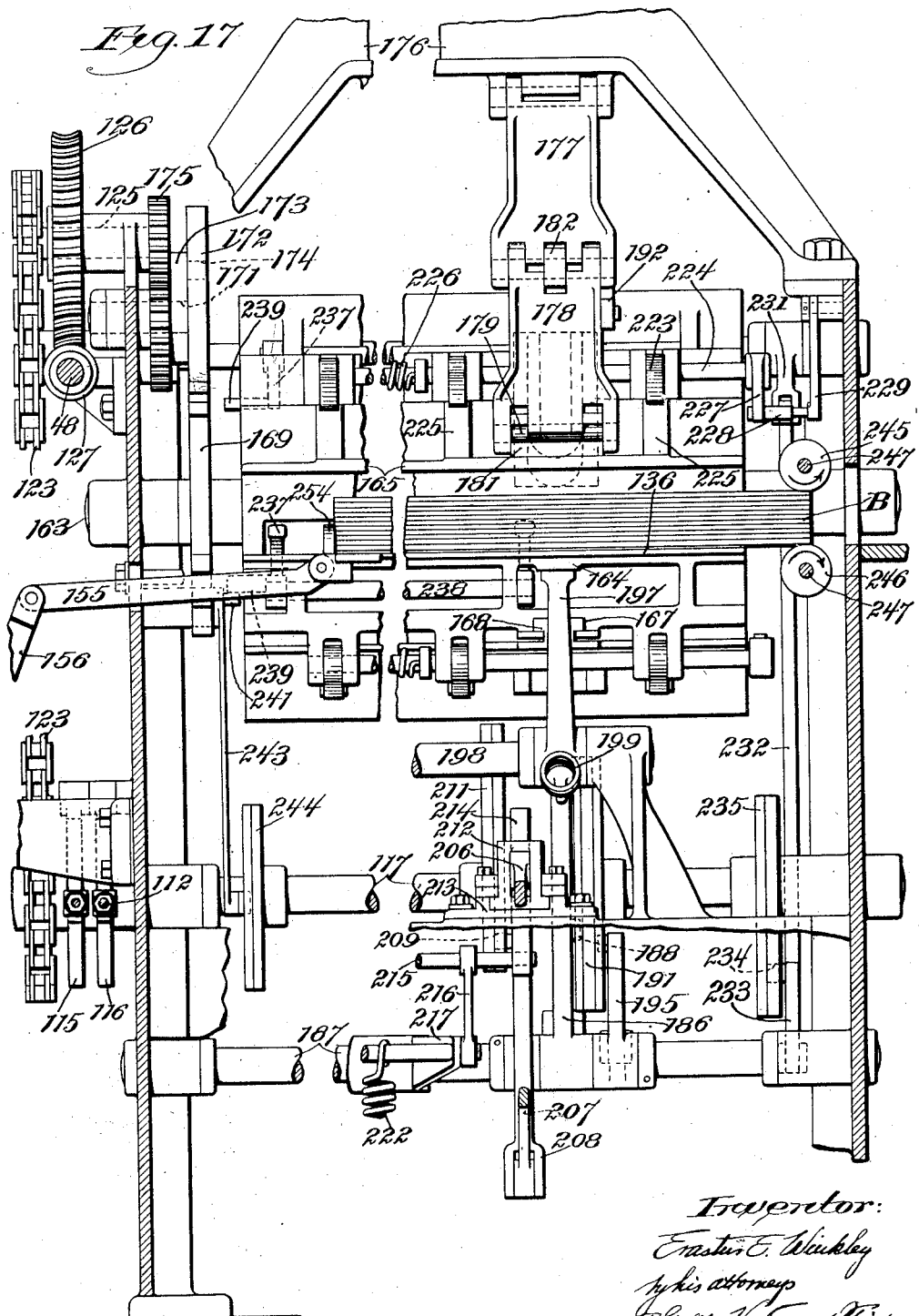

In the accompanying drawings Figure 1 is a plan-view of a machine embodying the present invention, with certain parts broken away to reveal details of construction; Fig. 2 is a side-elevation of the machine with the exception of the upper part of the feed-mechanism; Fig. 3 is an end-elevation of the machine, looking from left to right in Fig. 2, with parts of the framework broken away; Fig. 4 is a partial elevation of the machine from the direction opposite to that of Fig. 2, showing, particularly, the feeding and pasting mechanism; Fig. 5 is a partial vertical section, approximately on the line 5—5 of Fig. 4, but on a larger scale than the preceding figures; Fig. 6 is a partial vertical section, approximately on the line 6—6 of Fig. 5; Fig. 7 is a partial section, approximately on the line 7—7 of Fig. 6, showing, particularly, the paste-rollers and parts immediately associated therewith; Fig. 8 is a partial end-elevation of that part of the machine comprising, particularly, the feed-rollers and paste-rollers and the automatic stop-mechanism, looking from right to left in Fig. 1; Fig. 9 is a plan-view of the left-hand portion of the mechanisms shown in Fig. 8 including, particularly, certain details of the automatic stop-mechanism; Fig. 10 is a fragmentary plan-view, partly in horizontal section, showing particularly the parts of the mechanism shown in the right-hand portion of Fig. 8, and including the automatic stop-mechanism; Fig. 11 is a partial side-elevation, from the same direction as Fig. 4, of that part of the machine including the clamps and their actuating-mechanism; Fig. 12 is an end-elevation of that part of the machine shown in Fig. 11, looking from right to left in the latter figure, with parts broken away to reveal the construction; Fig. 13 is a perspective view of a heel-strip block, such as is manufactured by the machine of the present invention; Fig. 14 is a section, approximately on the line 14—14 of Fig. 11, but on a larger scale than the latter figure; Fig. 15 is a section, approximately on the line 15—15 of Fig. 11; Fig. 16 is a partial section, corresponding generally to that of Fig. 14, but showing the parts in a different position; Fig. 17 is a fragmentary side-elevation corresponding to the right-hand portion of Fig. 2, but with parts omitted or broken away to reveal the construction; Fig. 18 is a longitudinal vertical section, on the line 18—18 in Fig. 4, of the mechanism for supplying wedge-strips; Fig. 19 is a plan-view, in section on the line 19—19 in Fig. 18; Fig. 20 is a partial section on the same plane as Fig. 18, but on a larger scale and showing the parts in a different position; and Fig. 21 is a section on the line 21—21 in Fig. 20.

The illustrated embodiment of the invention is a machine designed particularly for making elongated blocks, which may be subsequently divided into shorter blocks, which are formed into shoe-heels. The machine produces the elongated blocks by pasting and assembling strips of leather-board or other sheet-material, and pressing and holding the strips together until the paste has set. It is provided with means for holding a supply of strips of sheet-material, these strips being arranged in stacks of graded widths. From the stacks, the machine automatically withdraws strips of the right number and in the proper order to make a heel-block graded in width from top to bottom in accordance with a predetermined design. The machine then applies paste to certain of the strips, superposes all the strips upon each other in a pile, and introduces the pile into a clamp, by which the strips are pressed together and held until the paste has set, thus producing a solid elongated block. This block is then automatically discharged from the machine.

The product of the machine is illustrated in Fig. 13. There the heel-strip block B is shown as comprising a series of strips S of graded widths and uniform thickness. Next to the lowest strip is shown a wedge-strip W, which is tapering in cross-section, so that the upper and lower surfaces of the heel-strip block are not parallel. It will be apparent to those skilled in the art of shoe-making that short pieces cut from the block, by transverse saw-cuts, will have a cross-section approximating the fore-and-aft section of a shoe-heel of ordinary form, and it will also be apparent that this section may be varied, to produce heels of different forms, by variations in the graded widths of the strips S, or in the number of wedge-lifts W which are introduced.

The means for holding the supply of strips are shown particularly in Figs. 1 to 5. The strips S of each of the graded widths are arranged in a stack, and each stack is supported upon flat horizontal bars 22, so that the stack extends horizontally, while the strips stand on edge in a nearly vertical position. Near their inner ends, the bars 22 are supported on horizontal cross-bars 23 which, in turn, rest upon collars fixed on vertical rods 24, these vertical rods constituting parts of the stationary framework of the machine. At their outer ends, the bars 22 rest on cross-bars 25, which are mounted on collars on stationary vertical rods or frame-members 26.

The inner ends of the bars 22 are bent downwardly at a slight inclination, as shown particularly in Fig. 3, and when the stacks are forced inwardly against these ends 27, the strips assume a slightly inclined position, the innermost strip of each stack standing clear of the angular extremities of the supporting bars beneath, but being retained in the stack by its frictional engagement with the bars above and with the next adjacent strip in the stack. To retain the strips in this position and feed them inwardly against the parts 27 as they are removed, a follower is provided for each stack, in the form of a bar 28 which slides upon the bars 22.

The follower 28 is pressed constantly against the outer end of the stack by mechanism comprising lazy-tongs 29, of which one end is attached to the follower. The other end of the lazy-tongs is attached to a block 30 mounted on the frame-rods 26 between the cross-bars 25 (Figs. 1 and 4). An arm 31, projecting outwardly from one of the members of each lazy-tongs, is connected with a tension-spring 32, of which the other end is fixed to the corresponding block 30, and this spring tends to cause extension of the lazy-tongs, so as to press the follower 28 inwardly.

The strips are fed from the stacks by automatic mechanism, shown particularly in Figs. 1, 3, 4 and 5. This mechanism comprises two pairs of sprocket-chains 33, which extend vertically between the inner ends of the stacks. One pair of chains is supported, above and below, upon sprocket-wheels 34 and 35, fixed upon shafts 36 and 37 respectively, these shafts turning in bearings on the frame of the machine. The other pair of chains is similarly supported by shafts 39 and 41.

Each sprocket-chain carries a feed-finger 38, which is rigidly attached to one of its links and extends outwardly from the chain, terminating in a hooked extremity. The chains move continuously in a direction to cause the fingers 38 to move downwardly past the stacks of strips, and the extremities of the fingers engage the upper edge of the outermost strip of each stack as they pass by, and withdraw this strip by a downward movement. The strip then falls freely past the lower stacks and into engagement with the other parts of the mechanism.

To impart a continuous movement to the chains 33, the shafts 37 and 41 are connected together at one end, as shown in Fig. 3, by gears 42, and a sprocket-wheel 43 is fixed on the shaft 41. This sprocket-wheel is connected, by a chain 44, with a sprocket-wheel on a shaft 45. The shaft is connected, by skew-gears 46 and 47, with the main shaft 48 of the machine.

The main shaft 48 is provided with pulleys 49 and 51, the latter being a loose pulley, while the former is arranged to drive the shaft, through clutch-mechanism hereinafter described.

As the strips fall downwardly, in their feeding movement, they are received by members which may be described as rockers, and which are shown particularly in Figs. 2, 4 and 5. The strips from the right-hand side of the machine are received by rockers 52, while the strips from the left-hand side of the machine are received by rockers 56. Each rocker comprises two parallel arms (Fig. 5), constituting a fork of which the ends are inclined away from each other to facilitate the reception of a strip between them. The rockers 52 are mounted in a set of four on a rock-shaft 53, and they stand upright, as shown in dotted lines in Fig. 5, for the reception of the strip. After receiving a strip, however, the shaft is turned to swing the rockers into the horizontal position shown in full lines in Fig. 5, whereby the strip held by the rockers is turned into a horizontal plane and is brought into a position at the middle of the machine.

In the case of two of the rockers 52, one arm is elongated to provide a circular segment 54. The function of this segment is to arrest a strip which may be fed while the rockers are in horizontal position, and to hold this strip until the rockers have swung back to the vertical position in which they may receive the strip. The strip, when held by the part 54, is supported laterally by downward extensions 50 from the lowermost of the bars 22, as shown in Fig. 5.

The rockers 56 are constructed and operate the same as the rockers 52, except that their actuating shaft 57 is lower than, and to the left of, the shaft 53, and is arranged to swing them in the opposite direction to that of the rockers 52, but at the same time. By this arrangement, the strips upon which the rockers 56 act are brought into horizontal position directly beneath the strips handled by the rockers 52.

In order to operate the rockers in the manner above described, gear-segments 58 and 59, which mesh together, are fixed on the ends of the shafts 53 and 57, as shown in Fig. 3, and the segment 59 is provided with gear-teeth which mesh with a segment 61 journaled on the frame of the machine. The segment 61 is connected, by a rod 62, with a cam-roller 63, and this roller engages an open cam 64 fixed on the shaft 45. The operative movements of the rockers are produced by a tension-spring 60 connected with the segment 61, while the cam 64 acts to produce the idle return-movements of the rockers.

In pasting the strips, preparatory to assembling them in a pile, it is desirable to avoid the application of any paste to the uppermost and lowermost surfaces of the pile, since these surfaces are engaged by the assembling and clamping mechanisms of the machine. As a simple method of providing paste at the proper points only, the machine is arranged to paste certain of the strips on both sides, and to alternate these strips with unpasted strips, the arrangement being such that the first and last strips of each pile are unpasted. It is for this purpose that the rockers are employed in two sets, which are arranged to bring the strips into different vertical positions, as above described. The rockers 56 bring the strips into alinement with paste-rollers, while the rockers 52 bring the strips into alinement with plain feed-rollers, located above the paste-rollers.

The feed-rollers 65 and 66 are shown particularly in Figs. 5 and 8. They are provided with flanges which engage the lateral surfaces of the strips. The roller 66 is mounted directly on the main-shaft 48, so as to be rotated constantly, and a gear 67, also fixed on the shaft, engages a gear 68 fixed on the shaft of the roller 65, so as to drive the latter at the same rate of speed as the lower roller. The bite of these rollers is in line with the strip when it is held by the rockers 52 in horizontal position, as shown in Fig. 5.

The paste-rollers are arranged below, and somewhat in the rear of, the feed-rollers. They comprise upper and lower rollers 69 and 71 respectively, having smooth surfaces adapted to apply paste over the faces of a strip, while advancing the strip in the same direction as in the case of the feed-rollers. In order to rotate the paste-rollers constantly, the shaft of the lower roller 71 is provided with a pinion 72, which engages an intermediate gear 73 journaled on the frame of the machine, and the gear 73 is driven, in turn, by a pinion 74 on the shaft 48. The upper paste-roller 69 is driven by gears 70 connecting the shafts of the two paste-rollers.

To provide paste upon the surface of the lower roller 71, a paste-trough 75 is fixed below this roller, and the roller dips into the paste in the trough, as shown particularly in Figs. 5 and 6. The upper paste-roller 69 is fed with paste by means of a perforated spray-pipe 76, the surplus paste from the spray-pipe being collected by a doctor 77, which discharges paste from its ends into the trough 75. The paste in the trough 75 overflows, through a pipe 78, into a tank 79, and from this tank the paste is drawn by a rotary pump 81, which discharges it, through a pipe 82, to the spray-pipe 76. The pump 81 is driven by a belt 83 connecting it with a pulley 84 on the shaft of the lower paste-roller.

It is important to avoid the presence of paste on the edges of the strips, in order that they may not adhere to the clamp-mechanism and other parts which engage the edges of the strips. Accordingly scrapers are provided, as shown particularly in Figs. 6 and 7, to remove any paste which may have been applied to the edges by the paste-rollers. These scrapers are in the form of plates 85, which are mounted on the upper ends of arms 86 in position to engage the edges of the strip as it issues from the paste-rollers. The arms are pivoted on heads 87 so that they may swing toward each other and toward the edges of the strip, and these heads are adjustably mounted on a transverse rod 88 fixed on the frame of the machine. Each head is provided with a depending arm 89, to which one end of a tension-spring 91 is attached, the other end of the spring being attached to a lug on the corresponding arm 86. These springs tend to rock the arms toward each other, so as to maintain the scrapers resiliently in engagement with the strips, regardless of variations in their width. The scrapers have rearwardly extending inclined portions to facilitate the reception of the advancing end of the strip, and they are also provided, as shown in the drawings, with downwardly extending troughs 92, which discharge the paste removed by the scrapers into the paste-trough 75.

In order to cause the strips to first engage the feed-rollers and the paste-rollers, it is necessary to impart a short longitudinal motion to the strips while they are held in the rockers, and a mechanism for this purpose is shown particularly in Figs. 2, 3 and 4. An arm 128 is fixed on a rock-shaft 129, which is journaled in brackets 130 on the frame of the machine. The arm has portions located in position to engage the rear ends of the strips in the rockers. The rock-shaft 129 is provided with an arm 131 (Fig. 4), which is pivoted to a rod 132 carrying a cam-roller 133 on its opposite end. This roller engages a face-cam 134 on the shaft 45. A tension-spring 135 is also connected with the rod and with the frame of the machine. At suitable times, as controlled by the cam 134, the spring pulls the rod 132 so as to rock the shaft, and the pusher-arm 128, in a direction to cause the latter to push the strips forwardly into engagement with the feed-rollers and the paste-rollers.

It is desirable that, in case the supply of strips in any of the stacks becomes exhausted during the operation of the machine, the machine shall stop until the supply has been renewed, in order that it may not go on working and produce imperfect results. Accordingly, the machine is provided with automatic mechanism for stopping it in such a contingency.

The bearings of the upper feed-roller 65 and the upper paste-roller 69 are pressed downwardly by springs 93, shown in dotted lines in Figs. 5 and 6, to cause these rollers to bear firmly against the strips passing beneath them, and whenever no strip is present between the rollers the springs act to move the upper rollers downwardly through a space equal to the thickness of a strip. Advantage is taken of this movement of the rollers to control the operation of the automatic stop-mechanism.

The pulley 49, as shown particularly in Figs. 8 and 9, is connected with the shaft 48 by a toothed clutch comprising a sliding clutch-member 94, which is keyed to the shaft 48 and controlled by a clutch-lever 95. A spring 96, attached to this lever, tends to swing it in a direction to disengage the clutch-member, this movement being arrested by engagement of the member 94 with a collar 97 fixed on the shaft 48.

After the machine has been set in motion, by manual movement of the clutch-lever 95 in a direction to engage the clutch-members, the lever is normally retained in the position shown in the drawings by means of a bolt 98, which slides vertically in the frame of the machine and engages, at its end, a beveled lug 99 on the clutch-lever (Fig. 5). A spring 100, coiled about the bolt and engaging a collar thereon, tends to raise the bolt, but it is normally held in depressed position by a hook-shaped detent 101 pivoted alongside the bolt in a position to engage the flange, as shown in Figs. 5 and 8.

The detent is pivotally connected with two rods 102 and 103 which are pivoted, in turn, to arms of two bell-crank levers 104 and 105 pivoted on the frame of the machine. These levers have horizontal arms which are connected, respectively, with rods 106 and 107. The rod 106 extends downwardly into engagement with the reduced end of the shaft of the upper paste-roller 69, while the rod 107 extends upwardly to the reduced end of the shaft of the upper feed-roller 65.

The bell-crank levers 104 and 105 are also connected with depending rods 108 and 109, respectively, which are connected, at their lower ends, with bell-crank levers 111 mounted on the frame of the machine. These levers are connected, in turn, by rods 112, to depending arms 113 and 114 pivoted on the frame of the machine.

The arms 113 and 114 coöperate with stop-disks 115 and 116, which are mounted upon and rotated by a cam-shaft 117. The arms 113 and 114 have each a lug 118 at their lower extremities, and these lugs coöperate with the peripheries of the disks 115 and 116. The disk 115 has a series of notches in its periphery, these notches corresponding to the number of strips which may be fed through the paste-rollers for the production of each block, while the disk 116 has notches corresponding with the number of strips which may be fed through the feed-rollers. These notches are so placed as to come successively opposite the lugs 118, in consequence of the rotation of the shaft 117, at the times when the feed-rollers and the paste-rollers are normally separated by the presence, between them, of strips.

Tension springs 119, connected with the bell-crank levers 11, tend to swing these levers in a direction to cause the lugs 118 to press against the peripheries of the stop-disks. Whenever one of the notches is opposite one of the lugs, the spring may cause a movement of the parts which, communicated to the detent 101 through the intervening rods and bell-crank levers, causes this detent to disengage the bolt 98 and release the clutch-lever. This action can occur, however, only if, owing to the absence of a strip between the rollers, the upper feed-roller or the upper paste-roller is moved downwardly, thus releasing the corresponding bell-crank lever 104 or 105 from the restraint of the rod 106 or 107. The notches on the stop-disks are so located as to be opposite the lugs 118 at such times as the strips should be present between the rollers. The unbroken portions of the peripheries of the stop-disks are opposite the lugs 118 at all other times. Consequently, the automatic stop can and does operate only at the times when strips should be between the feed-rollers and the paste-rollers, and only in case a strip is not present at any such time.

In order that the machine may be adapted to build blocks of various numbers of strips, the stop-disks are provided with adjustable filler-blocks 121, located in the notches in their peripheries, these blocks being movable to positions in which any of the notches are closed at the periphery, leaving only so many notches as correspond to the number of strips which are to be fed, and to the times in the cycle of operations in which such strips should be present between the feed-rollers and the paste-rollers.

The cam-shaft 117 is driven by means of a sprocket-wheel 122 fixed upon it (Fig. 3), this wheel being connected, by a chain 123, with a sprocket-wheel 124 on a shaft 125, journaled on the frame of the machine. The shaft 125 carries a worm-gear 126, which is rotated by a worm 127 on the main-shaft 48.

The strips which have been withdrawn from the rockers by the feed-rollers and the paste-rollers are discharged and assembled upon a support in the form of an elongated horizontal plate 136. This plate is supported by depending lugs 137, which slide upon parallel rods 138 constituting a part of the frame of the machine.

In order to guide the strips to their superposed positions upon the support, and also to continue the longitudinal movement of the strips after they leave the control of the main feed-rollers and the paste-rollers, supplementary feed-rollers are employed, as shown particularly in Figs. 6, 8 and 10. A pair of such rollers, 139 and 141, act on the strip issuing from the main feed-rollers 65 and 66, while a second pair of similar supplementary rollers, 142 and 143, act upon the strip issuing from the paste-rollers.

The rollers 141 and 143 are mounted on shafts 144 and 145, which turn in bearings 146 on the frame of the machine. The shaft 145 carries a pinion 147, meshing with an idler-gear 148 journaled on the frame of the machine, and the gear 148 meshes, in turn, with a pinion 149 on the shaft 144. The pinion 147 is driven by engagement with the gear 73, hereinbefore referred to, and the rollers 141 and 143 are thus driven at the same peripheral speed as the main feed-rollers and the paste-rollers.

The rollers 139 and 142 are fixed on shafts which turn in bearings 151. These bearings are mounted on pivots, as shown by dotted lines in Fig. 8, so that they may rock in a direction to move the rollers 139 and 142 downwardly. This rocking movement is produced by tension-springs 152 attached to the bearings 151, and thus the upper roller of each pair is caused to press firmly against the strip. The supplementary feed-rollers are arranged somewhat lower than the main feed-rollers and the paste-rollers, so as to bend the strips downwardly toward the position which they are to assume on the support 136. The strips are delivered upon the support 136 in superposed, approximately parallel positions, and are afterward more exactly alined, with respect to their lateral edges, by mechanism to be hereinafter described. Exact alinement of their ends is produced by means of end-gages 153 and 154, shown particularly in Fig. 6. The gage 153 is fixed adjustably to the support 136, while the gage 154 is fixed adjustably on the rods 138, and is bifurcated to clear the roller 143. The strips are delivered to the support in pairs, as shown in Fig. 6, and at the time of such delivery, the support is in a left-hand position (as seen in Fig. 6). After such delivery, however, the support is automatically moved in a right-hand or rearward direction, so as to engage the gage 153 with the forward ends of the strips, and then to move the strips rearwardly into engagement with the rear end-gage 154, thus alining the strips last delivered accurately with the lower strips of the pile.

The means for moving the support 136 as above described are shown particularly in Figs. 6 and 10. A rod 155 is pivoted to the rear end of the support and to the upper end of an arm 156, and this arm is fixed on a rock-shaft 157, which turns in bearings on the frame of the machine. A second arm 130

158 extends upwardly from the rock-shaft, and carries a cam-roller which engages a cam 159 on the shaft 45. This cam rotates once for each operation of the rockers and the feed-mechanism by which a pair of strips is delivered upon the support. The cam produces movement of the parts in one direction, while the return-movement is produced by a spring 161 coiled about and attached to the rock-shaft 157.

After the strips have been piled upon the support they are transferred to the clamp-mechanism, which is shown particularly in Figs. 11 to 17.

The clamp-mechanism comprises spiders 162, fixed on a shaft 163 which rotates in bearings on the frame of the machine. These spiders carry the fixed jaws 164 of four elongated clamps. The movable jaws 165 of the clamps move over the flat backs 166 of the clamps, these backs being provided with T-shaped guideways 167 upon which the shanks 168 of the movable jaws are fitted to slide.

The support 136 is directly in front of the position occupied by one of the clamps in each of the four positions of rest of the clamp-mechanisms, as shown in Figs. 14 and 15. After a pile has been introduced into that one of the clamps, the entire clamp-mechanism is given a quarter-rotation to bring the next clamp in order into position to discharge the finished block therefrom and receive a fresh pile of strips. The mechanism for producing this movement of the clamps is shown particularly in Figs. 14, 16 and 17. Fixed to the shaft 163 is a radially-slotted star-wheel 169 constituting part of a Geneva stop-mechanism. A locking-disk 172 coöperates, in the usual manner of such mechanisms, with the star-wheel, and the star-wheel is turned by engagement with its radial slots successively, of a pin 174 carried by a crank-arm 173, which is fixed on a shaft 171 alongside the disk 172. This arrangement is such that at each rotation of the shaft 171 the shaft 163 is given a quarter-rotation, and is then locked against further rotation for a period corresponding to about three-fourths of a rotation of the shaft 171. The shaft 171 turns in a bearing on the frame of the machine, and is driven by gears 175 (Fig. 17) which connect it with the shaft 125.

In order to subject the strips constituting the heel-strip block to a pressure sufficient to insure their close adhesion when the paste between them sets, the clamp-jaws are closed upon the strips by means of toggle-mechanism arranged to coöperate with the successive clamps as they come into operative position. For this purpose the frame of the machine comprises a yoke 176, to which are pivoted two powerful arms 177, constituting the upper members of toggle-levers, of which the lower members or arms 178 are pivoted to and depend from the arms 177.

The arms 178 are forked at their lower ends and provided with pivot-pins 179 which are adapted to coöperate with slotted lugs 181 on the movable clamp-jaws 165. This arrangement is such that when the toggles are straightened, as shown in Fig. 15, the movable clamp-jaw is forced downwardly, so as to compress the pile of strips between the clamp-jaws.

Each toggle is straightened and bent by means of a rod 182 pivoted to the middle of the toggle at its forward end, and connected, at its rear end, with a bell-crank lever 183 which is pivoted on a fixed rod 184. The levers 183 are actuated by rods 185. which connect them with cam-levers 186, the cam-levers being pivoted on a fixed rod 187. The cam-levers 186 carry cam-rollers 188 which engage cam-paths 189 in cams 191. The cams are mounted on, and actuated by, the cam-shaft 117.

After the clamp has been closed, as above described, and has been locked in closed position by means described hereinafter, it is necessary that it be disengaged by the toggle-mechanism in order that the clamp-mechanism may be rotated as above described. For this purpose rods 192 are pivoted to the lower toggle-arms 178, and these rods are connected with bell-crank levers 193, which are pivoted on the rod 184. The levers are connected, by rods 194, with cam-levers 195 which are pivoted on the rod 187. The cam-levers carry rollers which engage paths 196 in the cams 191, and the operation of this mechanism causes the arms 178 to be swung outwardly, to the position shown in Fig. 16, prior to the rotative movement of the clamp-mechanism, and then to be swung back into engagement with the movable jaw of the next clamp which is brought into operative position.

To relieve the Geneva stop-mechanism of the heavy strain incident to the action of the toggle-mechanism upon the clamp-jaws, the lower jaw of each clamp is supported, during this action, upon arms 197 which are pivoted upon and extend upwardly from a fixed rod 198. Springs 199, attached to the arms 197 and to a rock-shaft 201, tend to rock the arms into the operative position shown in Figs. 14 and 15. When rotation of the clamp-mechanism occurs the arms yield to such rotation by a forward swinging movement, and are then returned to operative position by the springs 199.

The mechanism for transferring the pile of strips from the support 136 to the clamp comprises five pairs of push-fingers, each pair comprising a finger 202 and a finger 203, which are arranged side-by-side and pivoted on opposite ends of a stud 204. Each stud 204 is adjustably fixed in a curved slot in one of a series of arms 205 fixed on the rock-shaft 201. The rock-shaft and the arms 205 are actuated by two arms 200 projecting downwardly from the shaft and connected with toggles 206. These toggles are actuated, in turn, by links 207, which connect them with cam-levers 208 arranged to rock on the rod 187. Each cam-lever carries a roller 209 which engages a path in a cam 211 actuated by the cam-shaft 117. When the toggle is straightened, as shown in Fig. 15, the arms 205 are swung inwardly so as to cause the push-fingers to push the piles of strips into place between the clamp-jaws.

The operative ends of the push-fingers are curved or beveled to conform to the contour of that part of the heel-strip block which they engage. To insure engagement of the edges of all of the strips, regardless of variations in the height of the piles of strips, the fingers of each pair are arranged to have a relative swinging movement about the stud 204, this movement being produced by a tension-spring 306 which is interposed between the fingers of each pair and connected to pins projecting from the respective fingers. The fingers remain in engagement with the strips while the movable clamp-jaw is descending, and the finger 202 yields to this movement by swinging about the stud 204. The inclination of the operative extremities of the fingers may be adjusted, to suit heel-strip blocks of different forms, by moving the studs 204 in the slotted ends of the levers 205. To compensate for different widths in the strips it is sometimes necessary to use fingers of various lengths, substituting one for the other as the occasion may arise.

In order to insure the exact lateral alinement of the edges of the strips it is necessary to subject the strips to a considerable pressure against the back 166 of the clamp, owing to the fact that this operation may require relative movement of several of the strips which have already been caused to adhere more or less by the paste on their contiguous surfaces. Means are accordingly provided for causing the fingers, and the toggle-mechanism by which they are actuated, to impart a heavy pressure against the edges of the strips when they are brought against the back of the clamp, this pressure being substantially invariable, notwithstanding slight variations in the width of the strips. For this purpose the fulcrum of each toggle 206 is provided by a block 212, which is arranged to have a short sliding movement in a guideway 213 fixed on the frame of the machine. A wedge 214 is interposed between each slide-block and the guideway, and these wedges are connected by a rod 215, which is connected, in turn, by links 216, with the ends of a forked lever 217. The lever is pivoted on the rod 187, and it carries a roller 218 which engages a path 219 in a cam 221 which is actuated by the cam-shaft 117. A spring 222, connected with the lever 217, tends to draw the wedges 214 downwardly. The cam 219 is so formed that, at the moment when the toggles 206 have been straightened as shown in Fig. 15, the roller 218 encounters a part of the cam 219 which is cut away toward the center, as shown in dotted lines, whereby the spring 222 is permitted to draw the wedges downwardly, and owing to their slight taper they force the slide-block 212 outwardly with considerable force, and thus impart the final effective pressure of the push-fingers against the strips.

In order to lock the clamp-jaws 165 in their closed position, several detents 223 are associated with each jaw, being fixed on a rock-shaft 224, which is mounted on each clamp, in position to swing into engagement with lugs 225 on the movable clamp-jaw. A spring 226, coiled upon and attached to the rock-shaft tends to turn it in a direction to cause such movement of the detents, and when the detents are in engagement with the lugs the movable clamp-jaw is prevented from moving away from the fixed clamp-jaw.

To remove the detents from operative position when it is necessary for the clamp to be opened, an arm 227 is fixed to the right-hand end of each rock-shaft 224 (Figs. 14 and 17), and when the clamp-mechanism is at rest, the end of that arm 227 which is associated with the clamp which is to be opened, is in alinement with a rod 228 which is suspended, in horizontal position, on a swinging link 229 pivoted to the frame of the machine. The rear end of the rod 228 is pivoted to a bell-crank lever 231, and this lever is actuated by a rod 232 which connects it with a cam-lever 233. The lever 233 rocks on the rod 187, and is provided with a roller 234 which engages a cam 235 on the cam-shaft 117. This mechanism operates to cause the rod 228 to push the arm 227 forwardly, thus disengaging the detents from the lugs 225, as shown in Figs. 14 and 17.

To accommodate the clamps to the various thicknesses of the heel-strip blocks which may be produced, and to the inclinations of their upper and lower surfaces, the fixed clamp-jaws are provided with removable shims 236, as shown in Figs. 14 and 15. By removing the shims and substituting others of different thicknesses the required pressure may be secured against blocks of various thicknesses.

After a block has remained in one of the clamps throughout four successive quarter-revolutions thereof, during which time is afforded for the setting of the paste, the block is removed from the clamp, first by a slight transverse movement to free it from engagement with the back of the clamp, in case any paste which exudes from between the strips may have caused it to stick to the clamp, and then by a longitudinal movement of the block out of the clamp and between the rollers which carry it away from the machine. The transverse movement by which the block is freed from the back of the clamp is produced by clearers associated with each clamp, these members having the form of curved fingers 237, fixed to a rock-shaft 238 which is journaled below the fixed clamp-jaw. One of the clearers, at the end of the rock-shaft, is provided with a lug 239, as shown in Figs. 14 and 17, and when the corresponding clamp is in position for the removal of the block this lug lies above the offset end of an arm 241, constituting part of a bell-crank lever which swings on a stud 242 on the frame of the machine. The other arm 243 of the lever carries a roller on its lower end, which engages a path in a cam 244, mounted on and actuated by the cam-shaft 117.

The lengthwise movement of the block from the clamp is produced by rollers 245 and 246 at the end of the machine. These rollers are mounted on shafts 247, which are journaled in brackets 248 adjustably fixed on the frame of the machine. The shafts 247 are connected, by miter-gears 251, with a vertical shaft 249 also journaled in the brackets 248, and the shaft 249 is geared, in turn, to a shaft 252, which is geared to the main-shaft 48 of the machine. The rollers are thus rotated constantly.

In order to introduce the block between the rollers 245 and 246, it is necessary to give it a short preliminary lengthwise movement, to bring its forward end out of the clamp and between the rollers, as shown in Fig. 17. This is accomplished by engagement of the rear end of the block with a finger 254 projecting from the support 136, as shown in Figs. 14 and 17. This finger is caused to act by a longitudinal movement of the support 136, and this movement is produced through the operation of a part of the mechanism by which the longitudinal movement of the support is produced, as hereinbefore described, for the purpose of alining the strips on the support. This mechanism comprises the lever 156 and the rock-shaft 157, but in the present instance the movement of the rock-shaft is produced, not by the lever-arm 158, but by another lever-arm 255, which depends from the shaft and carries a roller which engages a cam 256 on the shaft 117. This cam is timed to produce one operative movement at each cycle of operations of the machine.

For the purpose of feeding the wedge-strips W it is necessary to employ means somewhat different from those employed for feeding the other strips S, owing to the fact that the wedge-strips cannot be stacked closely together throughout their adjacent surfaces, owing to the difference in thickness between the thicker and thinner edges. Accordingly, the present machine is provided with means, for supplying wedge-strips, which are so constructed as to hold the strips with their thicker edges in juxtaposition, but with the thinner edges spaced apart by distances equal approximately to the thickness of the thicker edges.

As the illustrated machine is organized, only one wedge-strip is employed in each block, and this strip is the second strip in the order of feeding. Accordingly, the wedge-strip supplying means are employed at the top of the tier of stackholders shown at the left of Fig. 3. These means are shown particularly in Figs. 18 to 21.

The wedge-strips W are arranged in a stack with their thinner edges at the bottom, and these edges rest upon two horizontal racks 257 and 258 with inclined teeth. The rack 257, which may be described as the "feed-rack," comprises two similar members, between which lies the rack 258, which may be termed the "retainer-rack." Both racks are embraced within the recessed inner portion of a bar 259 which is substituted for the bar 22 employed in connection with the stackholders previously described. The flat U-shaped outer extremity of the bar 259 rests upon one of the bars 25 and is fixed in place by a pin 261. The recessed part of the bar 259 constitutes a housing for a spring 260 having fingers which press upwardly against the racks.

The retainer-rack 258 has a downwardly offset outward extension 262 which is perforated to receive the pin 261. The part 262 is free to slide on this pin, and thus vertical movements of the retainer-rack are permitted, while it is prevented from moving longitudinally. The feed-rack 257 also has a downwardly offset outward extension 263, which is slotted to embrace the part 262, and by means of this extension the feed-rack may be given longitudinal movements in addition to its vertical movements under the influence of the spring 260.

A follower 264 supports the outer end of the stack, and this follower is provided with lazy-tongs similar to those associated with the followers 28, previously described, although no spring is attached to these lazy-tongs. The movements of the follower are produced by the feed-rack, and for this purpose the follower is provided, on the bottom, with the beveled tooth 265 which engages both of the racks.

The upper and thicker edges of the wedge-strips are in engagement with a bar 266, and this bar is supported upon a bar 267 which rests upon the bars 23 and 25. The bar 267 is provided, at its inner end, with a depending extremity, but this extremity is somewhat shorter than the extremities 27 of the bars 22, and is provided with a spring-finger 268, which normally retains the innermost strip of the stack.

The wedge-strips are withdrawn from the stackholder just described in the same manner as the strips S are withdrawn, namely, by engagement of the upper edge of the innermost strip by the feed-fingers 38, as shown in dotted lines in Fig. 18. During the abstraction of the strip, the spring-fingers 268 yield to accommodate themselves to the tapering form of the strip. After a strip has been so withdrawn, it is necessary to advance the entire stack for the thickness of one strip, and this is done by the operation of the feed-rack 57. This rack is first retracted, or moved outwardly, through the space of one tooth, during which movement it moves downwardly, against the opposition of the spring 260, sufficiently to permit its teeth to ride under the edges of all of the strips, and at the end of this retracting movement, it springs upwardly again, each tooth being thus in engagement with the edge of the strip next in the rear of that last previously engaged. The feed-rack is then moved inwardly again through the space of one tooth, and by this movement the lower edges of all of the strips are advanced. At the same time, the follower 264 is advanced through the same space, and the follower accordingly advances the upper edges of the lifts through the same distance. During this advancing movement of the strips, the retainer-rack 258 springs downwardly to permit the lower edges of the strips to ride over its teeth, and then snaps back into a position to retain these edges upon the next outward movement of the feed-rack. Fig. 20 shows, in full lines, the positions of the parts during the advancing movement, while the final position, in which a strip is ready to be fed, is shown in dotted lines.

When the stackholder is emptied, the racks may be depressed by hand, and the follower drawn to its outermost position, and strips may then be introduced lengthwise into the space between the bar 266 and the racks.

The feed-racks are actuated by mechanism shown particularly in Figs. 3, 4, 18 and 19. The extremities 263 of the feed-racks are pivoted to arms 269 fixed on three vertical rock-shafts 270, 271 and 272. These shafts are supported, at their upper ends, in bearings on the outer ends of the bars 267, and the lower ends of the rock-shafts 270 and 271 are similarly supported by the lowermost bars 22. To provide for simultaneous movement of all of the rock-shafts, each is provided with an arm 273, these arms being connected together by a horizontal rod 274. The rock-shaft 272 extends downwardly to the level of the cam-shaft 117, and is provided with an arm 275 which carries a roller in engagement with a cam 276 on the cam-shaft. This cam is formed to actuate the rock-shafts and the feed-racks once for each rotation of the cam shaft, and as this cam-shaft rotates once for each cycle of operations of the machine, the wedge-strips are accordingly advanced once for each block which is assembled.

In case it should be desired to use more than one wedge-strip in each block, means similar to those just described may be substituted for any one of the stack-holders shown as employed for feeding ordinary strips.

The mechanism, just described, for feeding wedge-strips does not constitute part of the invention claimed herein, but is claimed in an application for Letters Patent of the United States filed October 16, 1916, Serial No. 125,952 on behalf of Fred V. Hart, said application and invention having been assigned to the applicant.

The operation of the machine as a whole is as follows: the strips S and W are arranged in stacks, by the operator, and placed in the holders. The number of the stacks corresponds to the number of strips required in the heel-strip block, and the stacks are arranged in such order that the strips, when fed successively from the uppermost to the lowermost stacks, shall be in the order of widths required to make a block of the desired cross-section. If the number of stacks used is less than the full number for which provision is made, the operator sets out such of the filler-blocks 121 in the stop-disks 115 and 116 as correspond to the vacant stations in the feed-mechanism.

The machine is then set in motion by means of the clutch-lever 95, and performs all of its functions automatically so long as the stacks of strips and the supply of paste are replenished when necessary. The feed-fingers 38, during their downward movement, withdraw a series of strips from the stacks, and as each pair of strips is received by the rockers they swing to horizontal position, whereupon the pusher-arm 128 moves the two strips into engagement with the feed-rollers and the paste-rollers. As shown in Fig. 3, however, the stacks of strips are so arranged that a strip from the uppermost of the right-hand tier of stacks shall be fed to and through the feed-rollers, and delivered to the support 136, without the simultaneous delivery of a strip from the left-hand tier through the paste-rollers, so that the first strip on the support shall be unpasted. Thereafter strips are fed from the two tiers simultaneously, so as to be delivered to the support in pairs, the lower strip of each pair being pasted on both sides.

As the strips are delivered to the support they are alined lengthwise by the end-gages 153 and 154. When the entire number of strips has been fed, an idle interval occurs in the feed-mechanism, while the feed-fingers 38 are moving upwardly out of engagement with the stacks. During this interval, a finished block is removed from one of the clamps, by the action of the pusher 254 and the rollers 245 and 246, and the push-fingers 202 and 203 then push the pile on the support into the empty clamp. The toggle-mechanism then closes the movable clamp-jaw, which is secured in place by the detents 223.

The toggle-arms 178 are next disengaged from the clamp, and the Geneva stop-mechanism imparts a quarter-rotation to the clamp-mechanism. At the same time the feeding and pasting operations are resumed, so as to produce another pile of strips on the support.

While the invention has been described as adapted particularly for handling strips or elongated pieces of sheet-material, in the production of heel-strip blocks, it will be understood that with respect to many of its novel features it is not limited to this specific purpose, and that it may be embodied in various other forms within the nature of the invention as it is set forth in the following claims.

What is claimed as new, is:—

1. A pasting and assembling machine having, in combination, a support; means for holding a supply of pieces of sheet-material; means for transferring successive pieces from said supply to said support and superposing them on the support; and means for pasting alternate pieces on both sides to cause them to adhere to the contiguous unpasted pieces.

2. A pasting and assembling machine having, in combination, a support; means for delivering pieces of sheet-material successively to, and superposing them on, said support; and means for pasting both sides of alternate pieces so delivered; the delivering-means being constructed and arranged to deliver, automatically, first an unpasted piece, then a pasted piece, then an unpasted piece, and so on, ending with an unpasted piece.

3. A pasting and assembling machine having, in combination, a support; means for holding pieces of sheet-material in stacks of graded sizes; means for transferring pieces from said stacks, in a predetermined order, to said support and for superposing the pieces thereon; and means for applying paste to both sides of alternate pieces so transferred.

4. A pasting and assembling machine having, in combination, a support; means for holding a supply of pieces of material; two mechanisms for transferring pieces from said supply to said support, and for superposing the pieces thereon, said mechanisms operating on alternate pieces; and pasting-mechanism associated with one only of the transferring-mechanisms.

5. A machine for assembling pieces of sheet-material having, in combination, means for holding a series of stacks of pieces, with the stacks extending horizontally and arranged one above another; means for withdrawing pieces singly from said stacks in succession, and for delivering said pieces to a common point below the stacks; a support; and means for transferring the pieces from said common point to said support and for assembling them thereon.

6. A machine for assembling pieces of sheet-material having, in combination, means for holding a stack of pieces, with the stack extending horizontally and the pieces standing on edge; a horizontal support; and means for removing a piece from the stack by a movement in the plane of the piece, turning the piece into horizontal position, and transferring it to said support.

7. A machine for assembling and pasting pieces of sheet-material having, in combination, means for holding a stack of pieces, with the stack extending horizontally and the pieces standing on edge; a horizontal support; means for removing a piece from the stack by a vertical movement, and for turning the piece into horizontal position; and means for pasting the piece and transferring it to said support.

8. A machine for assembling and pasting strips of sheet-material having, in combination, means for holding a stack of strips; a support; and means for removing strips singly from the stack, transferring them, by an endwise movement, to the support, superposing them thereon, and pasting the strips in their passage from the stack to the support.

9. An assembling machine having, in combination, means for holding a supply of pieces of sheet-material; a support; a series of clamps; means for withdrawing pieces from the supply and assembling them on the support; means for transferring the pile of assembled pieces from the support to one of the clamps; and means for moving the clamps successively into coöperative relation with the support.

10. A pasting and assembling machine having, in combination, an elongated clamp; an elongated support; means for pasting strips and for assembling them, in superposed parallel position, on said support in a position parallel with the length of the clamp; means for transferring the pile of strips laterally into the clamp; and means for closing the clamp upon the strips and moving it away from the support.

11. A pasting and assembling machine having, in combination, a clamp; means for pasting and assembling a pile of pieces of sheet-material; and means for forcing said pile into the clamp, by engagement with and pressure against the edges of the pieces, by a movement of an amplitude gaged automatically in accordance with the widths of the pieces in the pile.

12. A pasting and assembling machine having, in combination, a clamp; means for pasting and assembling a pile of pieces of sheet-material; and means for forcing said pile into the clamp, by engagement with the edges of the pieces, with a predetermined pressure sufficient to aline all the pieces firmly against the back of the clamp.

13. A pasting and assembling machine having, in combination, means for holding a supply of pieces of sheet-material; a clamp; and mechanism operating automatically to feed, paste and assemble a pile of said pieces, introduce the pile into the clamp, and close the clamp upon the pile.

14. A pasting and assembling machine having, in combination, means for holding a supply of pieces of sheet-material; a series of clamps; and mechanism operating automatically to feed, paste and assemble piles of said pieces, introduce the successive piles into successive clamps, close the clamps, interchange them, and discharge the piles from the clamps in succession.

15. A pasting and assembling machine having, in combination, means for holding a supply of strips of sheet-material; an elongated clamp; and means operating automatically to feed, paste and assemble a pile of said strips, introduce the pile, by a lateral movement, into the clamp, close the clamp, open the clamp, and withdraw the pile from the clamp by a longitudinal movement.

16. A pasting and assembling machine having, in combination, a support; means for pasting strips of sheet-material and for superposing them on the support; an end-gage mounted on the support; a stationary end-gage; and means for moving the support in a lengthwise direction after the application of the strips thereto, to cause engagement of the gages with the ends of the strips.

17. A pasting and assembling machine having, in combination, a support; means for pasting pieces of sheet-material and for superposing them successively on the support in the form of a stack; and means for engaging the respective ends of stack successively and moving the pieces into alinement.

18. A pasting and assembling machine having, in combination, paste-rollers; means for feeding strips of sheet-material to the rollers, the rollers acting to apply paste to the sides of the strips; means for removing paste from the edges of the strips after their passage between the rollers; and means for receiving the pasted strips in superposed position and alining them laterally by engagement with their edges.

19. A pasting and assembling machine having, in combination, a clamp; means for pasting and assembling a pile of strips of sheet-material and for introducing them into the clamp; means for closing and opening the clamp; and means for pushing the material laterally out of engagement with the back of the clamp.

20. A pressing machine having, in combination, a clamp; means for opening and closing the clamp; means for pushing material laterally out of engagement with the back of the clamp; and means for thereafter removing the material longitudinally from the clamp.

21. A pasting and assembling machine having, in combination, a clamp provided with two relatively-movable jaws; means for opening and closing the clamp by a movement of fixed amplitude; means for pasting and assembling a pile of pieces of sheet-material and introducing it into the clamp; and a removable shim, on one of the clamp-jaws, for adjusting the clamp to the thickness of the pile of material.

22. A pasting and assembling machine having, in combination, a movable carrier provided with a series of fixed clamp-jaws; a series of clamp-jaws movably associated with the fixed jaws; means for imparting intermittent movements to said carrier so as to bring the clamps successively to a definite operative position; and toggle-mechanism coöperative with the clamp in said position and acting automatically to engage the movable clamp-jaw, open and close it, and then disengage the jaw to permit movement of the carrier.

23. A machine having, in combination, a support; a clamp means for assembling pieces of sheet-material loosely in a pile on the support; means for pasting said pieces during the assembly; and additional means for alining the pieces by engagement with their edges and for introducing said pile into said clamp and subjecting it to pressure.

24. A machine having, in combination, means for feeding strips of sheet-material and for applying paste to alternate strips; means for assembling the strips in parallel position in a pile; and means for subjecting the pile to pressure to promote adhesion of the strips.

25. A machine having, in combination, means for successively feeding strips of sheet material, of graded widths, automatically in a predetermined sequence of widths; and means for securing the strips so fed together in the form of an elongated block.

26. An assembling machine having, in combination, means for holding a supply of pieces of sheet-material; means for successively feeding pieces from said supply; means for applying a coating of adhesive to alternate pieces; and means for alternately superposing uncoated and coated pieces the one upon the other.

27. An assembling machine having, in combination, means for holding a supply of pieces of sheet-material of graded sizes; means for successively feeding pieces from said supply in a predetermined order; means for applying a coating of adhesive to alternate pieces; and means for alternately superposing uncoated and coated pieces the one upon the other in said predetermined order.

28. An assembling machine having, in combination, means for holding a supply of pieces of sheet material in two spaced groups of stacks; two mechanisms for respectively feeding pieces from the respective groups in a predetermined order; two means respectively acting upon the pieces fed from the respective groups for alternately superposing them the one upon the other; and means for applying adhesive to the pieces from one of said groups.

29. An assembling machine having, in combination, means for holding a supply of pieces of sheet material in two spaced groups of stacks; two mechanisms for intermittently feeding pieces from the respective groups in pairs, and means for alternately superposing them the one upon another to form a pile of any desired number of pieces.

30. A machine for assembling pieces of sheet material having, in combination, means disposed the one above the other for holding horizontally disposed stacks of pieces; means for successively withdrawing pieces from said stacks and for superposing them the one upon the other below said stacks.

31. An assembling machine having, in combination, means for holding a supply of pieces of sheet material; pressure applying means; means for withdrawing pieces from said supply and assembling them in superposed relation, and means for transferring the superposed pieces to said pressure applying means.

32. An assembling machine having, in combination, means for superposing a plurality of pieces of sheet-material the one upon the other; a receiving member therefor; and means acting upon the edges of said pieces for forcing the superposed pieces into said receiving member by a movement dependent upon a dimension of said superposed pieces.

33. A pressing machine having, in combination, a receiving member; means for supporting articles that may be of different dimensions; and means dependent upon a dimension of each article for forcing each article into said receiving member with a substantially uniform pressure.

34. A pasting and assembling machine having, in combination, a support; means for pasting strips of sheet-material and superposing them upon the support; and relatively movable gages projecting upwardly at the ends of said support for engaging and alining the end edges of the superposed strips.

35. A pasting and assembling machine, having, in combination, a support; means for pasting strips of sheet-material and superposing them upon said support; a receiving member and means for engaging said superposed strips and forcing them laterally into said receiving member.

36. A pasting and assembling machine having, in combination, means for feeding and assembling in superposed relation strips of sheet material; means for coating the opposite sides of certain of said strips with paste, means for removing paste from the edges of the pasted strips, a clamping device and means for introducing said superposed strips therein.

37. A pasting and assembling machine having, in combination, means for feeding and assembling in superposed relation strips of sheet material; means for coating with paste the sides of certain of said strips, and means for removing the paste from the edges of said pasted strips.

38. A pressing machine having, in combination, a clamp to hold material to be pressed; means for closing and opening said clamp; and means for laterally moving the material from engagement with the back of said clamp.

39. A machine having, in combination, means for feeding strips of sheet-material, means for applying paste to certain of said strips; means for assembling the strips in superposed relation in separate piles; and means for separately subjecting said piles to pressure.

40. An assembling machine having, in combination, means for holding a supply of pieces of sheet material in two spaced groups of stacks, and means for feeding pieces from the respective groups of stacks and assembling them in superposed relation.

41. An assembling machine having, in combination, means for holding a supply of pieces of sheet material; means for successively feeding the pieces; laterally spaced receiving members disposed below said holding means for alternately receiving the successive pieces fed thereto; and means for turning said receiving members in opposite directions to position the pieces contained therein one above the other.

42. A pasting and asembling machine having, in combination, means for successively feeding strips of sheet material; and means for assembling said strips in superposed relation including a plurality of sets of feed rollers respectively coöperating with the alternate strips, one of said sets of feed rollers being adapted to apply adhesive to the strips upon which it acts.

43. A machine, having, in combination, a set of rollers for successively feeding a plurality of pieces; means for supplying power thereto; and automatic means dependent upon the relative position of said rollers for cutting off the power.

44. A pasting and assembling machine, having, in combination, means for successively feeding a plurality of strips of sheet-material; means for applying adhesive to certain of said strips and for assembling said strips in superposed relation; means for supplying power to operate each of said means; and automatic means for cutting off the supply of power when there is a lack of pieces for the assembling means to act upon.

45. A clamping machine having, in combination, a rotatable member having a plurality of sets of relatively movable clamping jaws; means for successively rotating said member to bring said sets of clamping jaws into operative position; means for applying pressure to said clamping jaws in said position; and means for rigidly engaging one of said jaws during the application of pressure.

46. Mechanism for feeding pieces of sheet material having, in combination, means for holding and feeding a plurality of said pieces in stacked face-to-face relation, a continuously operated chain, and means associated therewith for engaging the edges of said pieces at one end of the stack and positively ejecting them therefrom in the planes of the pieces.

47. Mechanism for feeding pieces of sheet material having, in combination, means for holding a stack of pieces, with the stack extending longitudinally and the pieces standing on edge, and means adapted to successively engage the upper edges of the pieces to remove them from the stack by a movement in the planes of the pieces.

48. Mechanism for feeding pieces of sheet material having, in combination, means for holding a stack of pieces, with the stack extending horizontally and the pieces standing on edge, means for feeding said stack of pieces toward one end of the holding means; a vertically traveling chain; and means carried thereby for engaging the successive endmost pieces of the stack and removing them therefrom in the planes of the pieces.

49. An assembling machine having, in combination, means for superposing a plurality of pieces of sheet material the one upon the other; a receiving member therefor adjacent thereto; and means acting upon the edges of said superposed pieces for forcing the pieces into said receiving member.

50. A machine having, in combination, a set of rollers for successively feeding a plurality of pieces; means for supplying power thereto; and automatic means for cutting off the supply of power when there is a failure of pieces for the feeding rollers to act upon.

51. A machine having, in combination, a continuously operating device for successively feeding a plurality of pieces; and means for automatically discontinuing the operation of said device when there is a failure of pieces upon which to act.

52. A machine having, in combination, means for feeding and assembling four or more flat strips of sheet material including means for applying paste to the opposite sides of each alternate strip, and means for applying pressure to the pile of assembled strips simultaneously over substantially the entire area.

53. A machine having, in combination, mechanism for transferring a series of pieces of sheet material from one position to another, means for supplying power to said transferring mechanism, and means coöperating with said transferring mechanism for automatically cutting off the supply of power when there is a failure of pieces for the transferring mechanism to act upon.

54. A machine having, in combination, mechanism for transferring a series of pieces of sheet material from one position to another, means for supplying power to said transferring mechanism, and means mounted independently of said transferring mechanism with which said mechanism coöperates to automatically cut off the supply of power when there is a failure of pieces for the transferring mechanism to act upon.

55. A machine having, in combination, mechanism for transferring a series of pieces of sheet material between separated stations, power mechanism therefor including a shaft and a clutch for driving the shaft the parts of which are normally held in operative position, and means including a detent for controlling the disengagement of the clutch operating automatically upon the failure of the transfer mechanism to transfer a piece.

56. A machine having in combination, a clamp; means for pasting and assembling pieces of sheet material in a pile and for introducing them into the clamp; means for closing the clamp to press the pile of pasted pieces and for opening the clamp to permit removal of the pressed pile; and means for removing said pile from the clamp.

57. A machine having, in combination, a support; a paste roll in advance of the support; means for feeding pieces of sheet material in contact with said paste roll and thence on to said support in a pile; means for alining said pile of pieces by engagement with their edges; a clamp; means for transferring said pile into said clamp; and means for closing the clamp to press the pile.

58. An assembling and pressing machine having, in combination, a support; means for pasting and stacking a plurality of pieces of sheet material on said support; pressure applying means; and separate means for transferring the stack of pieces from the support to said pressure applying means.

59. An assembling and pressing machine having, in combination, means for superposing a plurality of pieces of sheet material of different dimensions the one upon the other; a clamp; and additional means for alining the edges of said pile of pieces with all the edges at one side in the same plane and transferring the pile to the clamp.

60. A machine having, in combination, a series of clamps rotatable about a common axis; mechanism for transferring piles of superposed pieces of sheet material one by one to said clamps; a support; means for feeding a plurality of said pieces to said support and assembling them in piles; means for actuating said transfer mechanism to remove said piles successively from said support into said clamps; and means to move the clamps successively into register with the transfer mechanism and close them upon the piles.

61. A machine having, in combination, a series of clamps; means for moving said clamps intermittently past a common point; transfer mechanism at said point for delivering piles of superposed pieces of sheet material one by one to said clamps; means for forming said piles in a position to be engaged by said transfer mechanism; and means to actuate said transfer mechanism to deliver a pile to each clamp when it comes into register with said transfer mechanism.

62. An assembling and pressing machine having, in combination, a support; means for delivering successive series of pieces of sheet material to said support and superposing them thereon in a pile; sheet pasting mechanism interposed in the path of movement of said pieces; means for delivering the first piece of each series to said support in an unpasted condition; a series of clamps; means for moving said clamps intermittently past said support; and means for delivering a completed pile to each clamp when in a position opposite said support.

ERASTUS E. WINKLEY.